United States Patent
Fujiyoshi

(10) Patent No.: US 7,532,619 B2
(45) Date of Patent: May 12, 2009

(54) PACKET TRANSFER APPARATUS WITH MULTIPLE GENERAL-PURPOSE PROCESSORS

(75) Inventor: Takeshi Fujiyoshi, Tokyo (JP)

(73) Assignee: NEC Corporation, Tokyo (JP)

( * ) Notice: Subject to any disclaimer, the term of this patent is extended or adjusted under 35 U.S.C. 154(b) by 984 days.

(21) Appl. No.: 10/852,238

(22) Filed: May 25, 2004

(65) Prior Publication Data
US 2004/0243718 A1    Dec. 2, 2004

(30) Foreign Application Priority Data
May 26, 2003    (JP)    ............... 2003-147438

(51) Int. Cl.
*H04L 12/56*    (2006.01)
*H04J 1/16*    (2006.01)

(52) U.S. Cl. ............... 370/389; 370/252; 370/238; 370/386; 709/205

(58) Field of Classification Search ........... 370/237, 370/238, 389, 386, 392, 252; 709/238–242, 709/205; 455/422.1
See application file for complete search history.

(56) References Cited

U.S. PATENT DOCUMENTS

2003/0043825 A1    3/2003    Magnussen et al.
2004/0062267 A1*   4/2004    Minami et al. .......... 370/463
2004/0185845 A1*   9/2004    Abhishek et al. ....... 455/422.1
2005/0198247 A1*   9/2005    Perry et al. ............. 709/223
2006/0013227 A1*   1/2006    Kannan ................... 370/392

FOREIGN PATENT DOCUMENTS

| JP | 2000-349851 | 12/2000 |
| JP | 2001-345854 | 12/2001 |
| JP | 2002-351760 | 12/2002 |
| JP | 2002-354009 | 12/2002 |
| JP | 2002-359637 | 12/2002 |
| WO | WO 02/30045 | 4/2002 |
| WO | WO 02/091700 | 11/2002 |
| WO | WO 03/034670 | 4/2003 |

OTHER PUBLICATIONS

Japanese Office Action dated Jan. 22, 2008, with partial English translation.

* cited by examiner

*Primary Examiner*—John Pezzlo
(74) *Attorney, Agent, or Firm*—McGinn IP Law Group, PLLC

(57) ABSTRACT

A packet transfer apparatus with multiple general-purpose processors for an improved session control technique. The packet transfer apparatus is composed of a plurality of general-purpose processors, and a network processor adapted to forward packets belonging to the same session to the same one of said plurality of general-purpose processors.

16 Claims, 14 Drawing Sheets

Fig. 10

IP ADDRESS ASSIGNMENT

| PHYSICAL LINE | PRIMARY IP ADDRESS | | | SECONDARY IP ADDRESS (SHARED BY ALL THE GENERAL-PURPOSE PROCESSORS) |
|---|---|---|---|---|
| | CPU1 | CPU2 | CPU3 | |
| IF41 | 192.41.0.1 | 192.41.0.2 | 192.41.0.3 | 192.41.0.4 |
| IF42 | 192.42.0.1 | 192.42.0.2 | 192.42.0.3 | 192.42.0.4 |
| IF51 | 192.51.0.1 | 192.51.0.2 | 192.51.0.3 | 192.51.0.4 |
| IF52 | 192.52.0.1 | 192.52.0.2 | 192.52.0.3 | 192.52.0.4 |
| IF61 | 192.61.0.1 | 192.61.0.2 | 192.61.0.3 | 192.61.0.4 |
| IF62 | 192.62.0.1 | 192.62.0.2 | 192.62.0.3 | 192.62.0.4 |

Fig. 11

CONTENTS OF ROUTING TABLE
WITHIN NETWORK PROCESSORS

| DESTINATION IP ADDRESS | DESTINATION DEVICE ID | DESTINATION LINE ID |
|---|---|---|
| 192.41.0.1 | 1 | INVALID |
| 192.41.0.2 | 2 | INVALID |
| 192.41.0.3 | 3 | INVALID |
| 192.41.0.4 | 0 | INVALID |
| 192.42.0.1 | 1 | INVALID |
| 192.42.0.2 | 2 | INVALID |
| 192.42.0.3 | 3 | INVALID |
| 192.42.0.4 | 0 | INVALID |
| 192.51.0.1 | 1 | INVALID |
| 192.51.0.2 | 2 | INVALID |
| 192.51.0.3 | 3 | INVALID |
| 192.51.0.4 | 0 | INVALID |
| 192.52.0.1 | 1 | INVALID |
| 192.52.0.2 | 2 | INVALID |
| 192.52.0.3 | 3 | INVALID |
| 192.52.0.4 | 0 | INVALID |

| DESTINATION IP ADDRESS | DESTINATION DEVICE ID | DESTINATION LINE ID |
|---|---|---|
| 192.61.0.1 | 1 | INVALID |
| 192.61.0.2 | 2 | INVALID |
| 192.61.0.3 | 3 | INVALID |
| 192.61.0.4 | 0 | INVALID |
| 192.62.0.1 | 1 | INVALID |
| 192.62.0.2 | 2 | INVALID |
| 192.62.0.3 | 3 | INVALID |
| 192.62.0.4 | 0 | INVALID |
| 192.41.*.* | 4 | 41 |
| 192.42.*.* | 4 | 42 |
| 192.51.*.* | 5 | 51 |
| 192.52.*.* | 5 | 52 |
| 192.61.*.* | 6 | 61 |
| 192.62.*.* | 6 | 62 |

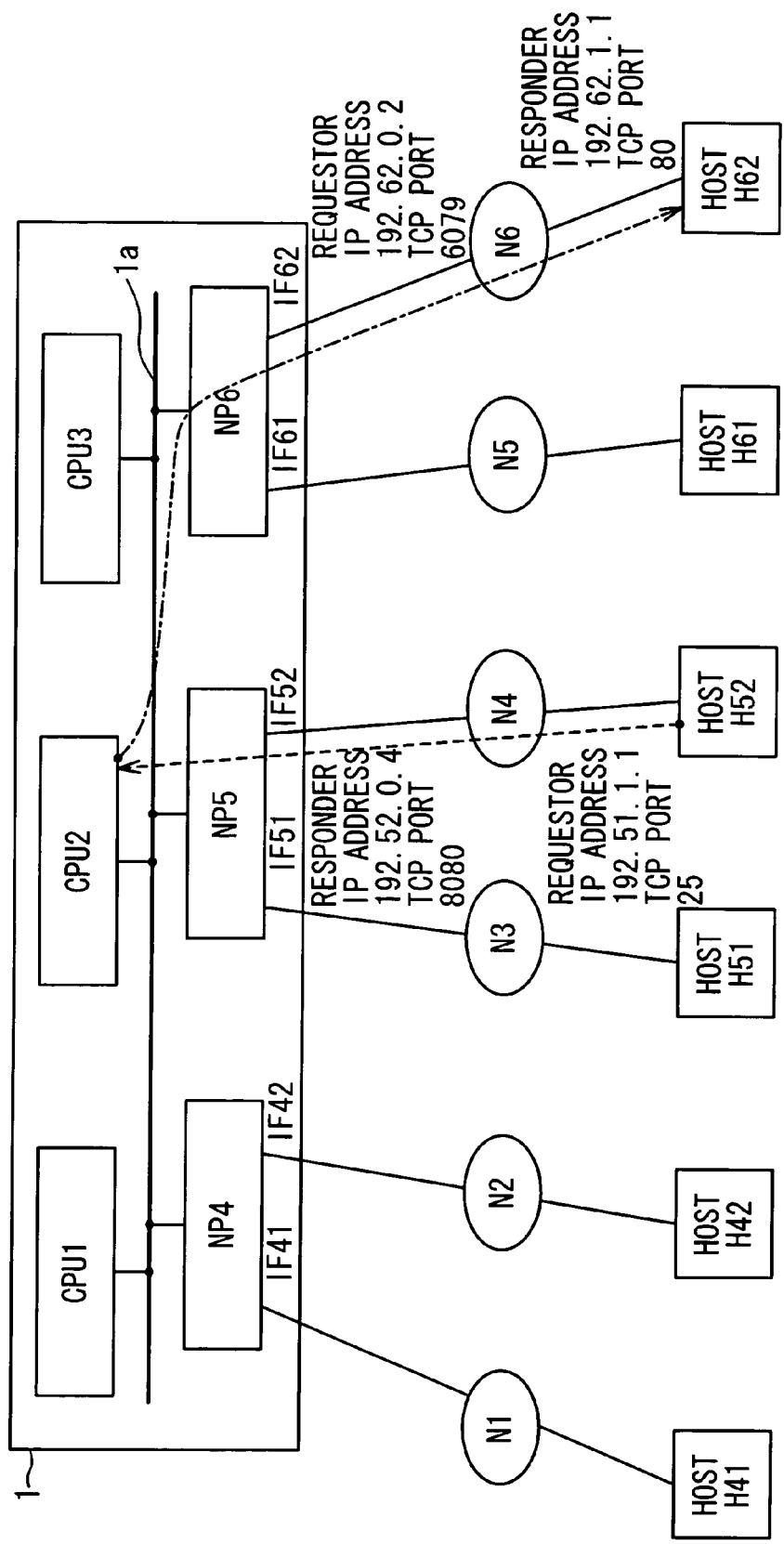

Fig. 14

SESSION MANAGEMENT TABLE WITHIN NP4

| ENTRY ID | FORWARDING DEVICE ID | AGE COUNTER VALUE |
|---|---|---|
| 0x000 | INVALID | 0 |
| 0x001 | INVALID | 0 |
| 0x002 | INVALID | 0 |
| ... | ... | ... |
| 0x1B5 | 1 | 6 |
| ... | ... | ... |
| 0x496 | 3 | 12 |
| ... | ... | ... |
| 0xFFF | INVALID | 0 |

SESSION MANAGEMENT TABLE WITHIN NP5

| ENTRY ID | FORWARDING DEVICE ID | AGE COUNTER VALUE |
|---|---|---|
| 0x000 | INVALID | 0 |
| 0x001 | INVALID | 0 |
| 0x002 | INVALID | 0 |
| ... | ... | ... |
| 0x1B4 | 1 | 8 |
| ... | ... | ... |
| 0x3C0 | 2 | 7 |
| ... | ... | ... |
| 0xFFF | INVALID | 0 |

SESSION MANAGEMENT TABLE WITHIN NP6

| ENTRY ID | FORWARDING DEVICE ID | AGE COUNTER VALUE |
|---|---|---|
| 0x000 | INVALID | 0 |
| 0x001 | INVALID | 0 |
| 0x002 | INVALID | 0 |
| ... | ... | ... |
| ... | ... | ... |
| 0x494 | 3 | 15 |
| ... | ... | ... |
| 0xFFF | INVALID | 0 |

PACKET TRANSFER APPARATUS WITH MULTIPLE GENERAL-PURPOSE PROCESSORS

BACKGROUND OF THE INVENTION

1. Field of the Invention

The present invention is generally related to packet transfer apparatuses, more particularly, to session control for packet transfer apparatuses adopting forwarding and control element separation architecture.

2. Description of the Related Art

Recent packet transfer apparatuses, such as gateways and routers, often adopt forwarding and control element separation architecture. Such packet transfer apparatuses are typically composed of one or more forwarding elements, and one or more control elements.

The most promising forwarding elements are network processors, which achieve fast packet forwarding by using software. Network processors have an advantage of flexibility over dedicated hardware such as ASIC (application specific integrated circuit) devices.

Conversely, control elements are typically based on general-purpose processors for providing control functionality.

Network processors and general-purpose processors are differently configured because of their different requirements. In order to achieve fast packet forwarding, network processors are configured to perform simple packet processing using size-reduced memories and low-level languages. This implies that network processors are not suitable for performing complex packet processing, including IP option processing, packet filtering in units of sessions, and packet termination. In contrast, general-purpose processors are configured to perform complex packet processing using increased memories and high-level languages, operating on general-purpose operating systems. Many operating systems support TCP/IP protocol processing, some further support filtering, address translation, and encryption, and this allows general-purpose processors to provide various functions for users. Therefore, in typical packet transfer apparatuses, network processors are designed to support processing on layer 3 and below, while general-purpose processors are designed to support IP option processing and other processing on layer 4 and above.

Although being superior in flexibility, general-purpose processors experience reduced processing speed. In order to solve this problem, packet transfer apparatuses often adopt load distribution architecture, each including multiple general-purpose processors. This effectively improves performances of packet transfer apparatus through parallel processing.

Packet transfer apparatuses are required to appropriately perform session control. Packets associated with the same session should be transferred to the same destination. Additionally, session control is desirably performed so as to avoid packet out-of-order problems.

Typical packet transfer apparatuses achieve session control using session management tables, as disclosed in Japanese Open Laid Patent Applications No. P2002-359637, 2001-345854, and 2000-349851; however, these documents do not disclose any appropriate session control technique for packet transfer apparatuses including a plurality of general-purpose processors. Although Japanese Open Laid Patent Application No. 2002-351760 discloses load distributing apparatuses, this technique is only related to load distribution among servers, not related to general-purpose processors within packet transfer apparatuses.

SUMMARY OF THE INVENTION

Therefore, an object of the present invention generally is to provide an improved session control technique for packet transfer apparatuses with multiple general-purpose processors.

In an aspect of the present invention, a packet transfer apparatus is composed of a plurality of general-purpose processors, and a network processor adapted to forward packets belonging to the same session to the same one of the plurality of general-purpose processors. This architecture allows the packets belonging to the same session to be processed by the same general-purpose processor, and thus achieves an improved session control. For example, processing packets belonging to the same session by the same general-purpose processor effectively reduces occurrence of "packet out-of-order problems".

Specifically, the network processor may include a session management table containing session management entries, each of which is associated with a session and contains a device ID identifying destined one of the general-purpose processors to which packets belonging to the associated session are to be forwarded. In this case, the network processor is preferably programmed to, upon receiving an incoming packet which requires processing by arbitrary one of the general-purpose processors, when the session management entries include a validated session management entry associated with a session to which the incoming packet belongs, forward the incoming packet to the destined general-purpose processor identified by the device ID within the validated session management entry. In contrast, for the case when the session management entries include no validated session management entry associated with the session to which the incoming packet belongs, the network processor is preferably programmed to select destined one of the general-purpose processors to which the incoming packet is to be forwarded, and to prepare, within the session management table, another validated session management entry associated with the session to which the incoming packet belongs, the another session management entry including a device ID associated with the selected one of the general-purpose processors.

The network processor is preferably programmed to, when receiving another incoming packet having a destination IP address associated with one of the general purpose processors, forward the another incoming packet to the associated one of the general purpose processors.

In order to appropriately control validation/invalidation of each session management entry, each of the session management entries preferably includes an age counter value indicating whether the session management entry is invalidated, and the network processor is preferably programmed to modify the age counter values within the session management entries at constant time intervals towards a first predetermined value to thereby invalidate the session management entries, to determine whether each of the session management entries is invalidated based on the associated age counter value, and to, when the session management entries include the validated session management entry associated with the session to which the incoming packet belongs, set the age counter value within the associated validated session management entry to a second predetermined value.

The network processor may be programmed to select least-loaded one of the general-purpose processors as the destined general-purpose processor to which the incoming packet is to be forwarded. Instead, the network processor may be programmed to select the destined one of the general-purpose processors in a predetermined order. In the case when the network processor is mounted on a board on which at least one of the general-purpose processors is mounted, the network processor may be programmed to select the destined general-purpose processor out of the at least one of the general-purpose processors.

In order to allow different sessions to be associated with different entries with each entry size-reduced, it would be preferable that each of the session management entries further contains an entry ID associated with the session, and that the network processor is programmed:

to determine an entry ID using a hash function with source and destination IP addresses, and source and destination port numbers of the incoming packet used as arguments, to, when the session management entries include no validated session management entry containing the determined entry ID, prepare another validated session management entry containing the determined entry ID, and a device ID identifying destined general-purpose processor selected out of the general-purpose processors, and to forward the incoming packet to the destined general-purpose processor, and to, when the session management entries include a validated session management entry containing the determined entry ID, forward the incoming packet to the destined general-purpose processor identified by the device ID contained in the validated session management entry.

In another aspect of the present invention, a packet transfer apparatus is composed of a plurality of general-purpose processors and a plurality of network processors, each including a session management table containing session management entries, each of which contains an entry ID associated with a session, and a device ID identifying destined one of the general-purpose processors to which packets belonging to the associated session are to be forwarded. Each of the network processor is programmed:

to, when receiving an incoming packet that requires processing by arbitrary one of the general-purpose processors, to determine an entry ID using a hash function with source and destination IP addresses, and source and destination port numbers of the incoming packet used as arguments, to, when the session management entries include no validated session management entry containing the determined entry ID, prepare another validated session management entry containing the determined entry ID, and a device ID identifying destined general-purpose processor selected out of the general-purpose processors, and to forward the incoming packet to the destined general-purpose processor, to, when the session management entries include a validated session management entry containing the determined entry ID, forward the incoming packet to the destined general-purpose processor identified by the device ID contained in the validated session management entry, to calculate a session ID using the hash function with the source and destination IP addresses, and the source and destination port numbers of the incoming packet used as arguments, to determine the entry ID to include the session ID and a destination device ID identifying destined one of the network processors, through which the incoming packet is transmitted from the packet transfer apparatus to an external node, to, when receiving an outgoing packet from originating one of the general-purpose processors, calculate another session ID using the hash function with source and destination IP addresses, and source and destination port numbers of the outgoing packet used as arguments, to determine another entry ID to include the anther session ID and an incoming device ID identifying an incoming network processor out of the network processors, the incoming network processor receiving the outgoing packet from an external node, and to update the device ID within one of the session management entry associated with the entry ID to a device ID identifying the originating one of the general-purpose processors.

The hash function is preferably defined so that the source and destination IP addresses used as the arguments commute with each other, and so that the source and destination port numbers used as the arguments commute with each other.

When each of the session management entries includes an age counter value indicating whether the session management entry is invalidated, the network processor is preferably programmed:

to modify the age counter values within the session management at constant time intervals towards a first predetermined value to thereby invalidate the session management entries, to determine whether each of the session management entries is invalidated based on the associated age counter value, to, when the session management entries include the validated session management entry associated with the session to which the incoming packet belongs, set the age counter value within the associated validated session management entry to a second predetermined value, and to, when the session management entries include the validated session management entry associated with the session to which the outgoing packet belongs, set the age counter value within the associated validated session management entry to a second predetermined value.

In still another aspect of the present invention, a computer program product for a network processor within a packet transfer apparatus including a plurality of general-purpose processors, comprising:

a set of code modules adapted to forward packets belonging to the same session to the same one of the plurality of general-purpose processors.

When the network processor includes a session management table containing session management entries, each of which is associated with a session and contains a device ID identifying destined one of the general-purpose processors to which packets belonging to the associated session are to be forwarded, the set of code modules includes:

a code module adapted to, upon receiving an incoming packet which requires processing by arbitrary one of the general-purpose processors, when the session management entries include a validated session management entry associated with a session to which the incoming packet belongs, forward the incoming packet to the destined general-purpose processor identified by the device ID within the validated session management entry.

In still another aspect of the present invention, a computer program product for a packet transfer apparatus including a plurality of general-purpose processors and a plurality of network processors, which is to be installed into each of network processors, comprising:

a session management table containing session management entries, each of which contains an entry ID associated with a session, and a device ID identifying destined one of the general-purpose processors to which packets belonging to the associated session are to be forwarded, a code module adapted to, when receiving an incoming packet that requires processing by arbitrary one of the general-purpose processors, to determine an entry ID using a hash function with source and destination IP addresses, and source and destination port numbers of the incoming packet used as arguments, a code module adapted to, when the session management entries include no validated session management entry containing the determined entry ID, prepare another validated session management entry containing the determined entry ID, and a device ID identifying destined general-purpose processor selected out of the general-purpose processors, and to forward the incoming packet to the destined general-purpose processor, and a code module adapted to, when the session management entries include a validated session management entry containing the determined entry ID, forward the incoming packet to the destined general-purpose processor identified by the device ID contained in the validated session management entry.

BRIEF DESCRIPTION OF THE DRAWINGS

FIG. 10 is a table illustrating IP address assignment in the network system in this embodiment;

FIG. 11 is a table illustrating contents of routing tables within the network processors;

FIG. 13 is a block diagram illustrating packet transmission in the sessions S3 and S4; and FIG. 14 depicts contents of session management tables within the network processors.

DESCRIPTION OF THE PREFERRED EMBODIMENTS

Preferred embodiments of the present invention are described below in detail with reference to the attached drawings.

Structure of Packet Transfer Apparatus

Figure 1:
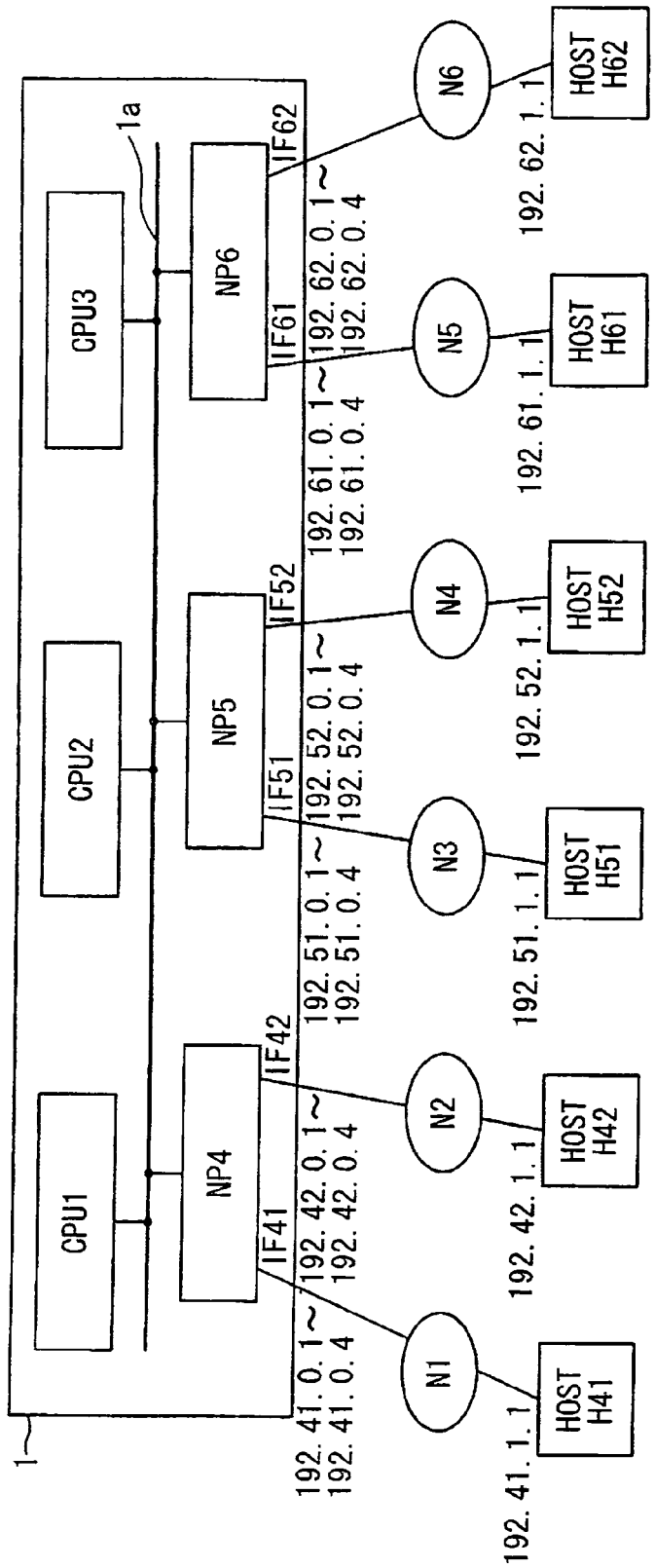
FIG. 1 is a network system within which a packet transfer apparatus according to the present invention is incorporated in one embodiment.

In one embodiment, with reference to FIG. 1, a packet transfer apparatus 1 is designed to support TCP/IP packet processing including forwarding, filtering, address translation, and application gateway. Specifically, the packet transfer apparatus 1 is composed of a plurality of general-purpose processors CPU1, CPU2, CPU3, which are used as control elements, and a plurality of network processors NP4, NP5, NP6, which are used as forwarding elements. These processors are connected over an intra-apparatus network 1a. The network processor NP4 accommodates physical line interfaces IF41, and IF42. Correspondingly, the network processor NP5 accommodates physical line interfaces IF51, and IF52, and the network processor NP6 accommodates physical line interfaces IF61, and IF62.

The general-purpose processors CPU1, CPU2, CPU3, and the network processors NP4, NP5, NP6 are respectively identified by device IDs. In this embodiment, the general-purpose processors CPU1, CPU2, CPU3 are respectively identified by device IDs "1", "2", and "3", and the network processors NP4, NP5, NP6 are respectively identified by device IDs "4", "5", and "6".

Correspondingly, the physical line interfaces IF41 to IF62 are identified by line IDs. In this embodiment, the physical line interfaces IF41, IF42, IF51, IF52, IF61, and IF62 are identified by line IDs "41", "42", "51", "52", "61", and "62", respectively.

The network processors NP4 through NP6 are used to provide packet forwarding for computer nodes, or host computers. In this embodiment, the network processor NP4 is connected to hosts H41 and H42. Correspondingly, the network processor NP5 is connected to hosts H51 and H52, and the network processor NP6 is connected to hosts H61 and H62.

General Purpose Processor Architecture

The general-purpose processors CPU1, CPU2, and CPU3 are configured to support IP option processing and other processing on layer 4 and above, more specifically, to provide packet processing in connection with TCP/IP (transmission control protocol/internet protocol), including IP packet routing, session filtering, address translation, and various application gateways.

Figure 2:
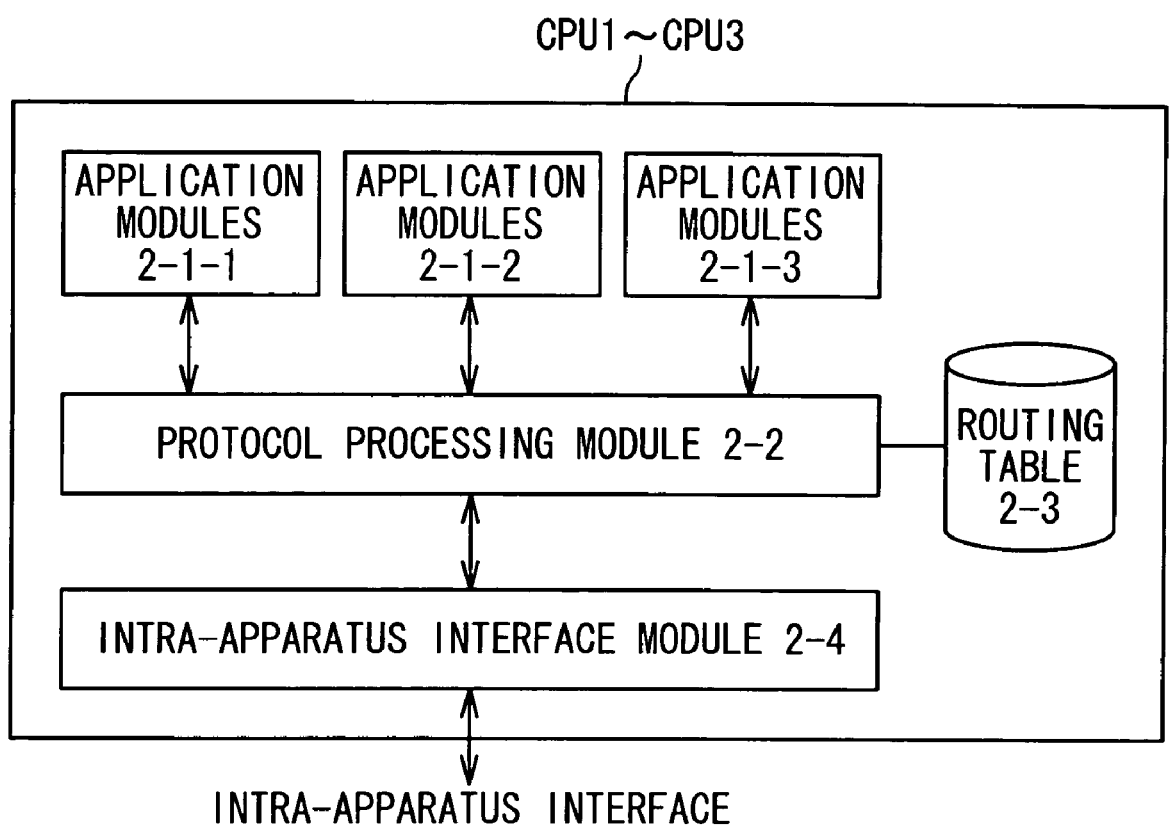
FIG. 2 is a block diagram illustrating a software structure of general-purpose processors within the packet transfer apparatus in this embodiment.

As shown in FIG. 2, the packet processing within the general-purpose processors CPU1, CPU2, and CPU3 is achieved by software, including application modules 2-1-1 through 2-1-3, a protocol processing module 2-2, a routing table 2-3, and an intra-apparatus interface module 2-4.

The application modules 2-1-1 through 2-1-3 perform two-way communications with hosts over the IP networks using TCP or UDP (united data processing) sessions. The application modules 2-1-1 through 2-1-3 are used to achieve application gateways.

The protocol processing module 2-2 handles TCP and UDP protocol processing. Specifically, the protocol processing module 2-2 terminates TCP and UDP sessions in response to requests from the application modules 2-1-1 through 2-1-3. Additionally, the protocol processing module 2-2 performs forwarding of IP packets that are not terminated by the packet transfer apparatus 1. The protocol processing module 2-2 may provide session filtering, address translation, or IPSec VPN (IP security virtual private network).

The routing table 2-3 includes routing entries, each containing a destination IP address and interface parameters associated with the destination IP address, including the line ID of the destination line interface, and the IP address of the next hop host. The contents of the routing table 3-3 are configured by users, and the application modules 2-1-1, 2-1-2, and 2-1-3.

The intra-apparatus interface module 2-4 provides the protocol processing module 2-2 with an interface of incoming and outgoing packets. Specifically, the intra-apparatus interface module 2-4 performs data conversion to provide connections between the protocol processing module 2-2 and the intra-apparatus interface 1a.

Network Processor Architecture

Figure 3:
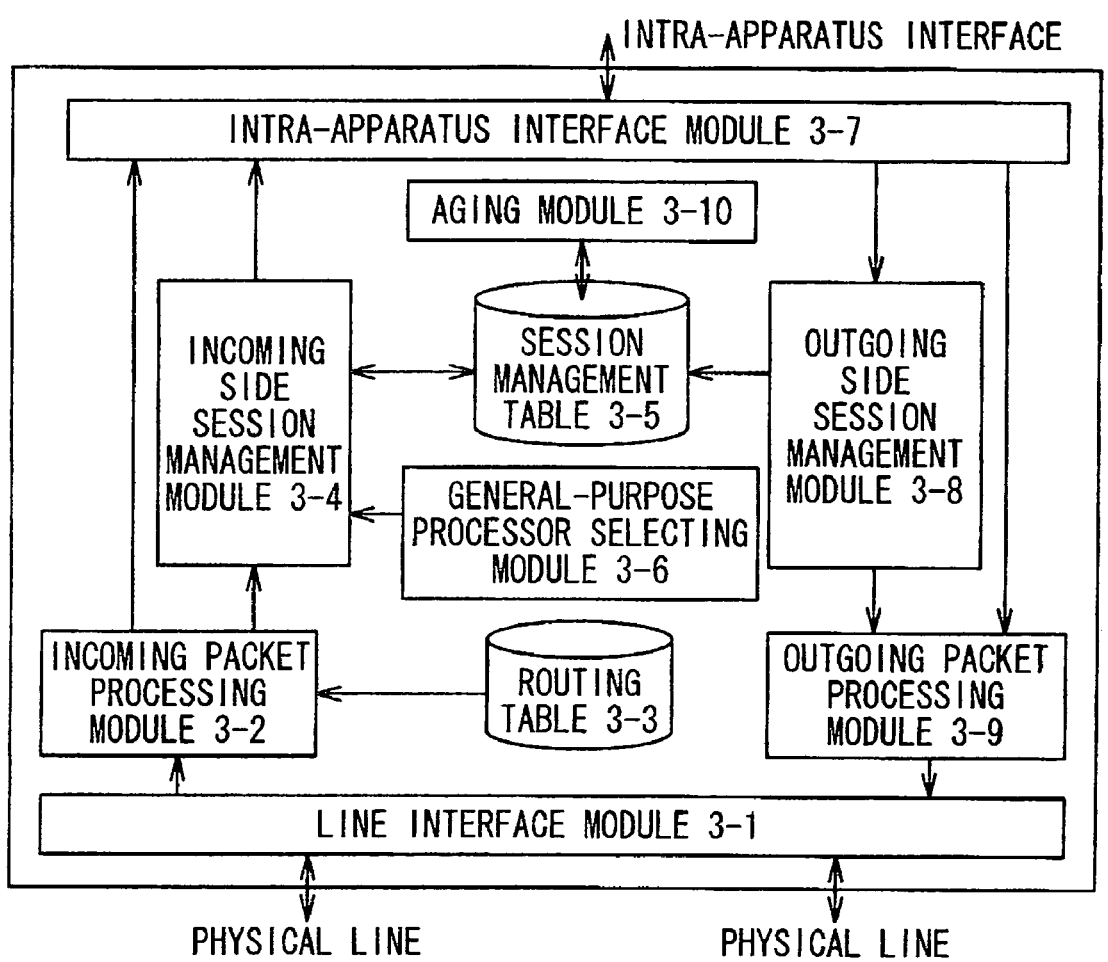
FIG. 3 is a block diagram illustrating a software structure of network processors within the packet transfer apparatus in this embodiment.

The network processors NP4 through NP6 are configured to support processing on layer 3 and below. FIG. 3 illustrates software structure of the network processors NP4 through NP6. The software installed on the network processors NP4 through NP6, which is stored in a recording medium, such as a disk, a semiconductor memory, and so forth, includes a line interface module 3-1, an incoming packet processing module 3-2, a routing table 3-3, an incoming side session management module 3-4, a session management table 3-5, a general-purpose processor selecting module 3-6, an intra-apparatus interface module 3-7, an outgoing side session management module 3-8, and an outgoing packet processing module 3-9.

The line interface module 3-1 receives and transmits packets through the physical line interfaces associated therewith; the line interface module 3-1 extracts incoming packets from the received signals on the associated physical lines, and forwards the incoming packets and the incoming line IDs to the incoming packet processing module 3-2. Additionally, the line interface module 3-1 forwards the outgoing packets received from the outgoing packet processing module 3-9 to the destination physical lines, which are identified by the destination line IDs received from the outgoing packet processing module 3-9.

The incoming packet processing module 3-2 is configured to handle the incoming packets received from the line interface module 3-1. The incoming packet processing module 3-2 performs various packet processing on the incoming packets, and then obtains interface parameters associated with the incoming packets, including the destination device and line IDs associated with the destination IP addresses described in the in coming packets. The incoming packet processing module 3-2 selects the intra-apparatus interface module 3-7 and the incoming side session management module 3-4 in response to the obtained destination device and line IDs, and forwards the incoming packets and interface parameters to the selected modules.

As shown in FIG. 11, the routing table 3-3 including routing entries, each includes a destination IP address, a destination device ID and a destination line ID. The destination device ID may be selected out of the device IDs associated with the network processors and the general purpose processors within the packet transfer apparatus 1. The destination device ID is allowed to be "0", which indicates arbitrary general-purpose processors.

Referring back to FIG. 3, the incoming side session management module 3-4 is configured to achieve session control for the incoming packets to be forwarded to the general-purpose processors. The incoming side session management module 3-4 receives the packets and interface parameters to be forwarded to the general-purpose processors from the incoming packet processing module 3-2, and selects destinations of the received packets and interface parameters out of the general-purpose processors, using the session management table 3-5 and the general-purpose processor selecting module 3-6. After selecting the destinations, the incoming side session management module 3-4 forwards the packets and interface parameters associated therewith to the intra-apparatus interface module 3-7.

Figure 7:
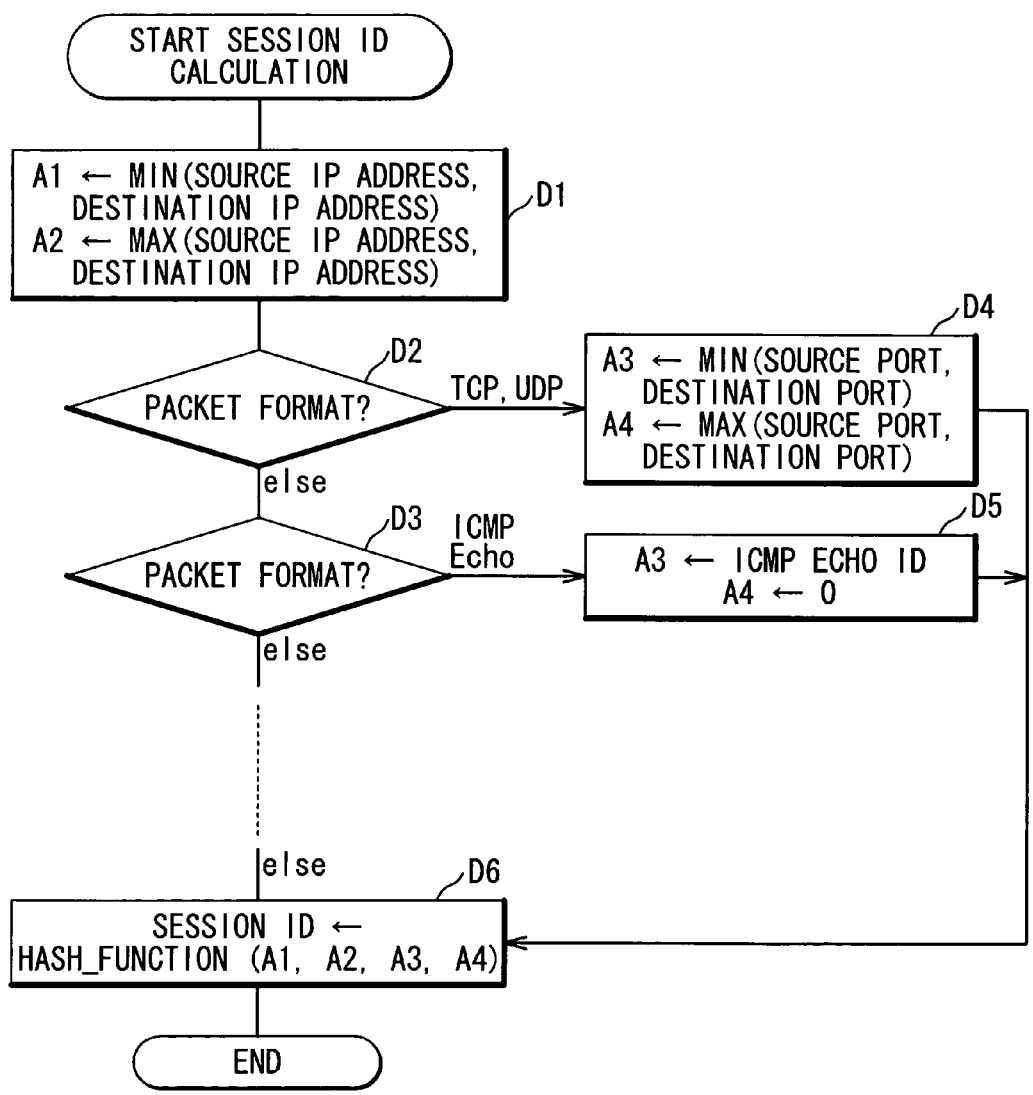
FIG. 7 is a flowchart illustrating a procedure for calculating a session ID.

The incoming side session management module 3-4 is also configured to update the session management table 3-5. As shown in FIG. 7, the incoming side session management module 3-4 calculates session IDs from packet header data described in the incoming packets, including source and destination IP addresses. The data used for calculating the session IDs additionally include source port numbers, and destination port numbers for TCP and UDP packets, and include ICMP Echo IDs for ICMP Echo packets. The calculation of the session IDs is based on a hash function taking the packet header data as arguments. The calculation method illustrated in FIG. 7 allows packets associated with the same session to be associated with the same session ID. This is important for the packets associated with the same session to be forwarded to the same general-purpose processor. Additionally, the incoming side session management module 3-4 determines entry IDs used for addressing the session management table 3-5 from the session IDs and the destination device IDs.

The session management table 3-5 is composed of a plurality of session management entries addressable by the entry IDs. As shown in FIG. 14, each of the session management entry contains a forwarding device ID and an age counter value. The forwarding device IDs are indicative of the general-purpose processors to which the packets associated with the respective session management entries are forwarded. The age counter values are indicative of whether the associated session management entries are valid or invalid. When a specific age counter value is "0", this indicates that the associated session management entry is invalid. Otherwise, the associated session management entry is valid. The age counter values are set to a predetermined maximum value (typically the value consisting of all bits "1") by the incoming and outgoing side session management modules 3-4 and 3-8, and decreased by one at constant time intervals by the aging module 3-10. When a specific age counter value reaches "0", the associated session management entry is invalidated.

The general-purpose processor selecting module 3-6 selects one of the general-purpose processors for each established session, and informs the incoming side session management module 3-4 of the device ID of the selected general-purpose processor. In one embodiment, the general-purpose processor selecting module 3-6 may select the least-loaded general-purpose processor. In an alternative embodiment, the general-purpose processor selecting module 3-6 may sequentially select the general-purpose processors in a predetermined order. When the general-purpose and network processors are distributed over multiple motherboards within the packet transfer apparatus 1, the general-purpose processor selecting module 3-6 may select a general-purpose processor mounted on the same motherboard as the incoming network processor, which receives the associated incoming packet. Instead, the general-purpose processor selecting module 3-6 may select a general-purpose processor mounted on the same motherboard as the outgoing network processor, from which the associated outgoing packet is transmitted to the destination.

Figure 8:
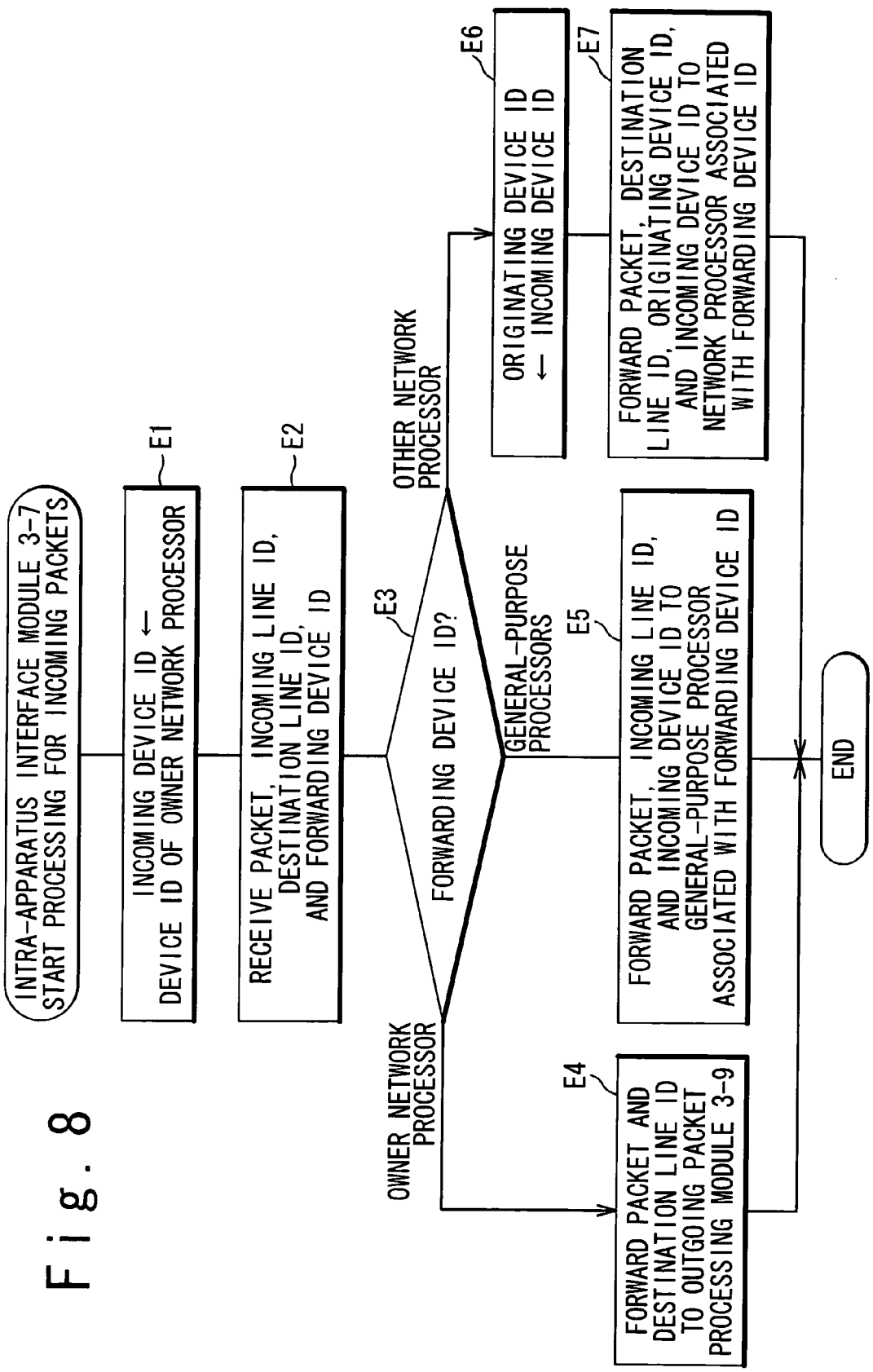
FIG. 8 is a flowchart illustrating operations of intra-apparatus interface modules within the network processors.
Figure 9:
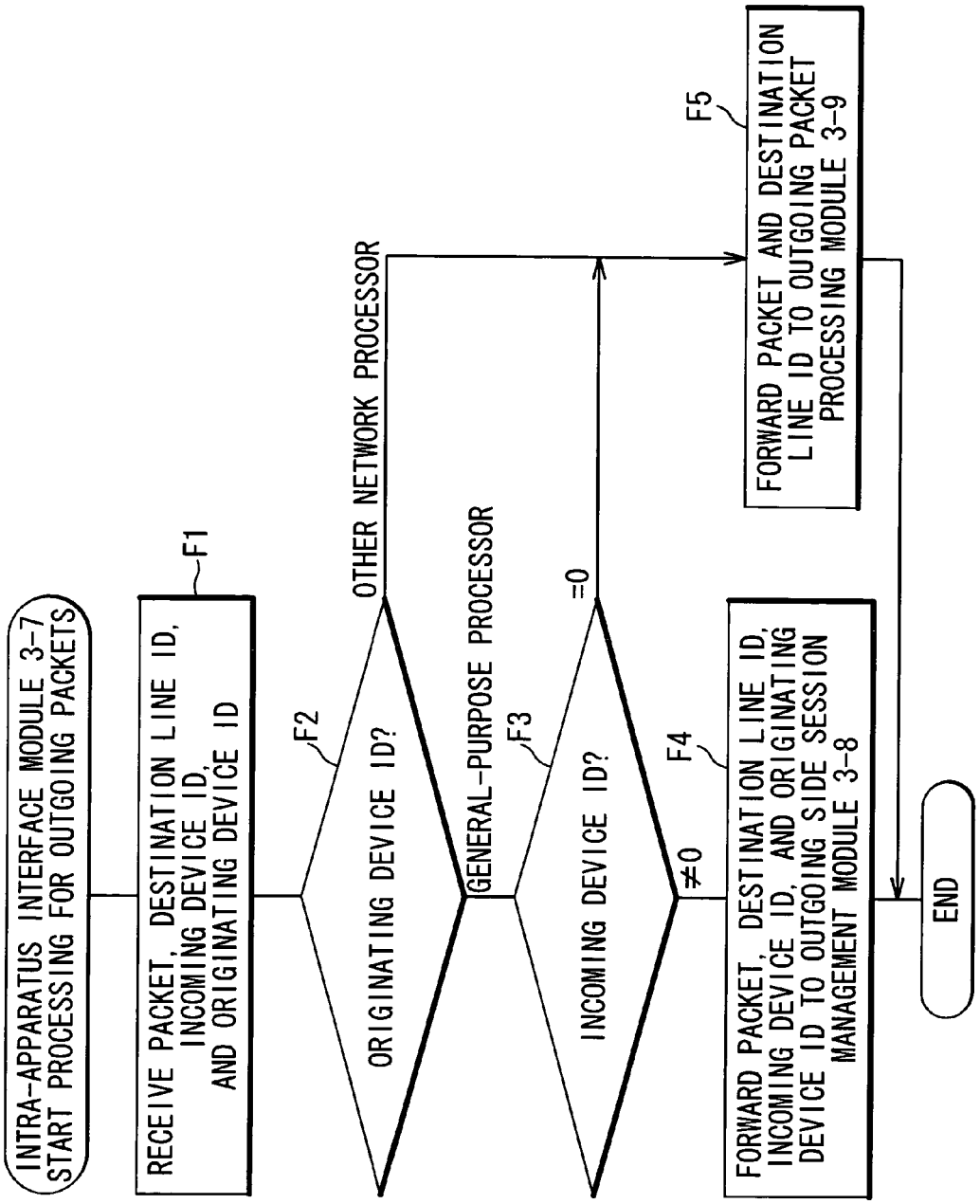
FIG. 9 is another flowchart illustrating operations of the intra-apparatus interface modules within the network processors.

The intra-apparatus interface module 3-7 is used to exchange packets and the associated interface parameters with the general-purpose processors and other network processors. As shown in FIG. 8, the intra-apparatus interface module 3-7 receives the incoming packets and associated interface parameters from the incoming packet processing module 3-2 and the incoming side session management module 3-4, and forwards the received packets and interface parameters to destined one of the general-purpose processors and the network processor, the destined processor being selected in response to the forwarding device IDs within the received interface parameters. Additionally, as shown in FIG. 9, the intra-apparatus interface 3-7 receives the outgoing packets and associated interface parameters from other network processors and the general-purpose processors, and forwards the received packets and interface parameters to the outgoing side session management module 3-8 or the outgoing packet processing module 3-9 in response to the originating device IDs described in the interface parameters.

Referring back to FIG. 3, the outgoing side session management module 3-8 is configured to achieve session control for the outgoing packets. The outgoing side session management module 3-8 receives the outgoing packets and interface parameters from the intra-apparatus interface module 3-7, and forwards the outgoing packets and destination line IDs to the outgoing packet processing module 3-9.

The outgoing side session management module 3-8 is also configured to update the session management table 3-5 on the basis of the received interface parameters in the same manner as the incoming side session management module 3-4. As is the case of the incoming side session management module 3-4, the outgoing side session management module 3-8 calculates session IDs from the packet header data within the outgoing packets, and determines entry IDs for addressing the session management table 3-5 from the session IDs and the incoming device IDs.

The outgoing packet processing module 3-9 receives the outgoing packets and the destination line IDs from the intra-apparatus interface module 3-7 and the outgoing side session management module 3-8, and forwards the received outgoing packets and interface parameters to the line interface module 3-1 after performing necessary packet processing on the outgoing packets on the basis of the associated interface parameters.

IP Address Assignment and Contents of Routing Table

As shown in FIG. 1, each of the physical line interfaces IF41 through IF 62 is assigned four IP addresses associated with the same subnet; three are primary IP addresses used for accessing the general-purpose processors during the sessions in which the packet transfer apparatus 1 functions as the source host, and the remaining one is a secondary IP address used as the representative IP address for the packet transfer apparatus 1 during the sessions in which the packet transfer apparatus 1 functions as the destination host. The primary IP addresses are respectively associated with the general-purpose processors, and different from each other, while the secondary IP address is shared by all of the general-purpose processors. This results in that the number of the IP addresses assigned to each physical line interface is the number of the general-purpose processors plus one.

As shown in FIG. 11, the routing tables 3-3 stored in the network processors NP4 to NP6 describes the above-mentioned primary and secondary IP addresses as the destination IP addresses in the routing entries. The destination device and line IDs associated with the destination IP addresses are determined in the routing tables 3-3 so that the incoming packets are forwarded to the desired destinations. The contents of the routing entries are described below in detail.

The routing entries associated with the destination IP addresses "192.41.*.*" to "192.42.*.*" are used to achieve IP packet forwarding; therefore the destination device IDs are selected out of "4", "5", and "6", which are associated with the network processors NP4, NP5, and NP6, respectively. The contents of these routing entries are identical to those of the routing table 2-3 stored in the general-purpose processors CPU1, CPU2, and CPU3.

The remaining routing entries are used for forwarding packets destined to the packet transfer apparatus 1 to the general-purpose processors. Specifically, the routing entries having destination device IDs of "1", "2", and "3" are used for forwarding packets to the general-purpose processors CPU1, CPU2, and CPU3, respectively. The destination IP addresses within these routing entries are selected out of the primary IP addresses associated with the general-purpose processors. In contrast, the routing entries having destination device ID of "0" are used for allowing packets to be forwarded to any of the general-purpose processors. The destination IP addresses within these routing entries are selected out of the secondary IP addresses. A specific packet whose destination IP address is entered in a specific routing entry having the destination device ID of "0" has its destination selected out of the general-purpose processors CPU1 to CPU3 through processing performed by the incoming side session management module 3-4 and the general-purpose processor selecting module 3-6.

Operation of the Data transfer Apparatus (Overview)

In this embodiment, each network processor is programmed to, when receiving an incoming packet that requires processing by arbitrary one of the general-purpose processors CPU1 to CPU3, determine whether the session management table 3-5 include a validated session management entry associated with a session to which the incoming packet belongs. If so, the network processor forwards the incoming packet to the destined general-purpose processor identified by the device ID described within the validated session management entry. Otherwise, the network processor selects destined one of the general-purpose processors to which the incoming packet is to be forwarded, and prepares, within the session management table 3-5, another validated session management entry associated with the session to which the incoming packet belongs so that the prepared valid session management entry includes a device ID associated with the selected one of the general-purpose processors. The network processor then forwards the incoming packet to the selected general-purpose processor.

This architecture effectively allows the incoming packets belonging to the same session to be forwarded to the same general-purpose processor.

Figure 12:
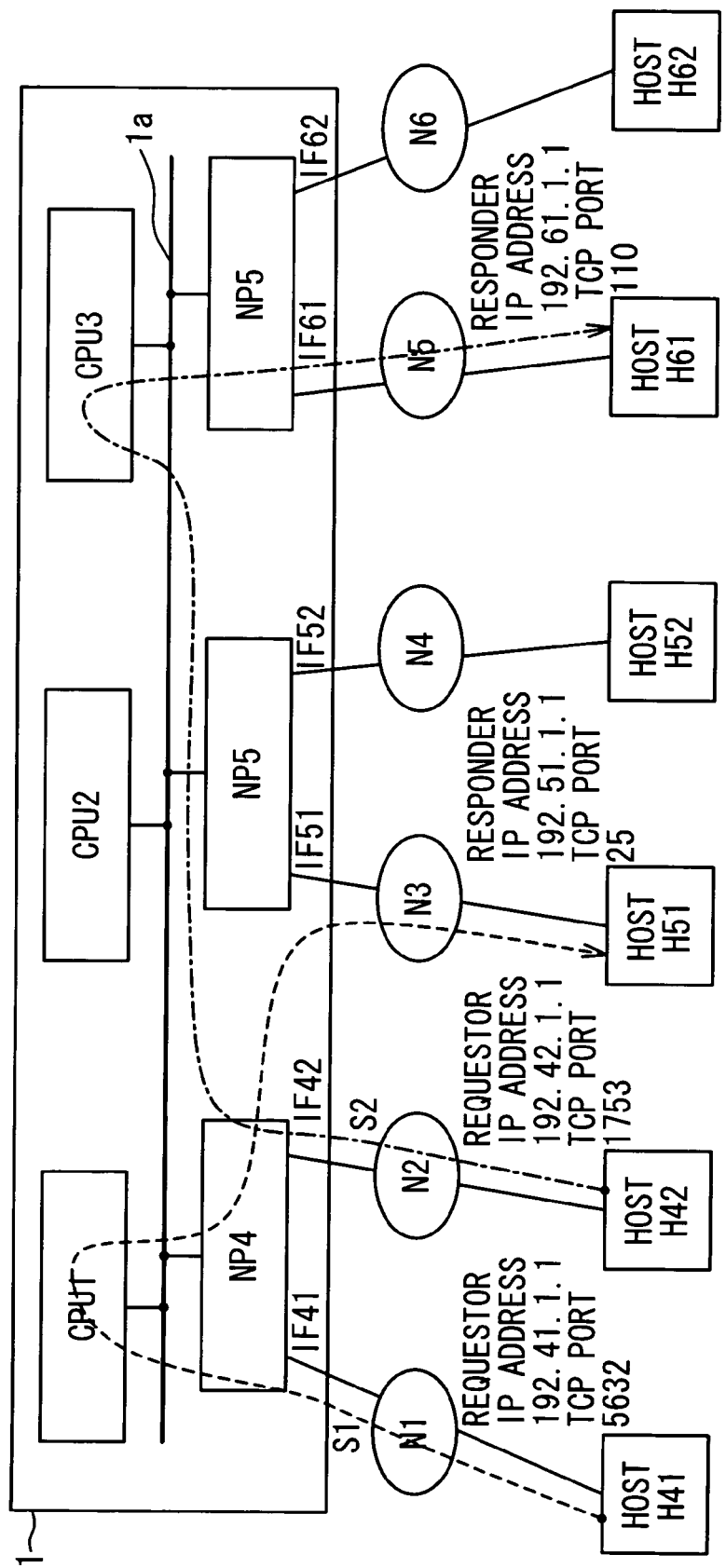
FIG. 12 is a block diagram illustrating packet transmission in the sessions S1 and S2.

In the following, the operations of the packet transfer apparatus 1 are described in details. The operations include TCP sessions between two of the hosts H41 to H62, and TCP sessions between specific one of the general-purpose processors and specific one of the hosts H41 to H62. The former sessions are referred to as sessions S1 and S2 as illustrated in FIG. 12, and the latter TCP sessions are referred to as sessions S3 and S4 as illustrated in FIG. 13. The sessions S3 and S4 addresses application gateways using the packet transfer apparatus 1 to achieve data transfer between the hosts H52 and H62.

(Packet Transmission in the Forward Direction during Session S1)

With reference to FIG. 12, the TCP session S1 is established between the hosts H41 and H51. The hose H41 operates as a requesting host while the host H51 operates as a responding host. During the session S1, TCP packet transmissions are performed using the requestor IP address of "192.41.1.1", the requestor port number of "5632", the responder IP address of "192.51.1.1", and the responder port number of "25".

The session S1 begins with sending an IP packet, which is referred to as a forward packet hereinafter, from the requesting host H41 to the responding host H51. The forward packet has a source IP address of "192.41.1.1", a destination IP address of "192.51.1.1", a source port number of "5632", and a destination port number of "25". The forward packet is transmitted to the network processor NP4 of the packet transfer apparatus 1 over the network N1.

The line interface module 3-1 within the network processor NP4 receives the forward packet from the physical line interface IF41, and forwards the forward packet and an incoming line ID of "41", which is associated with the interface IF41, to the incoming packet processing module 3-2.

Figure 4:
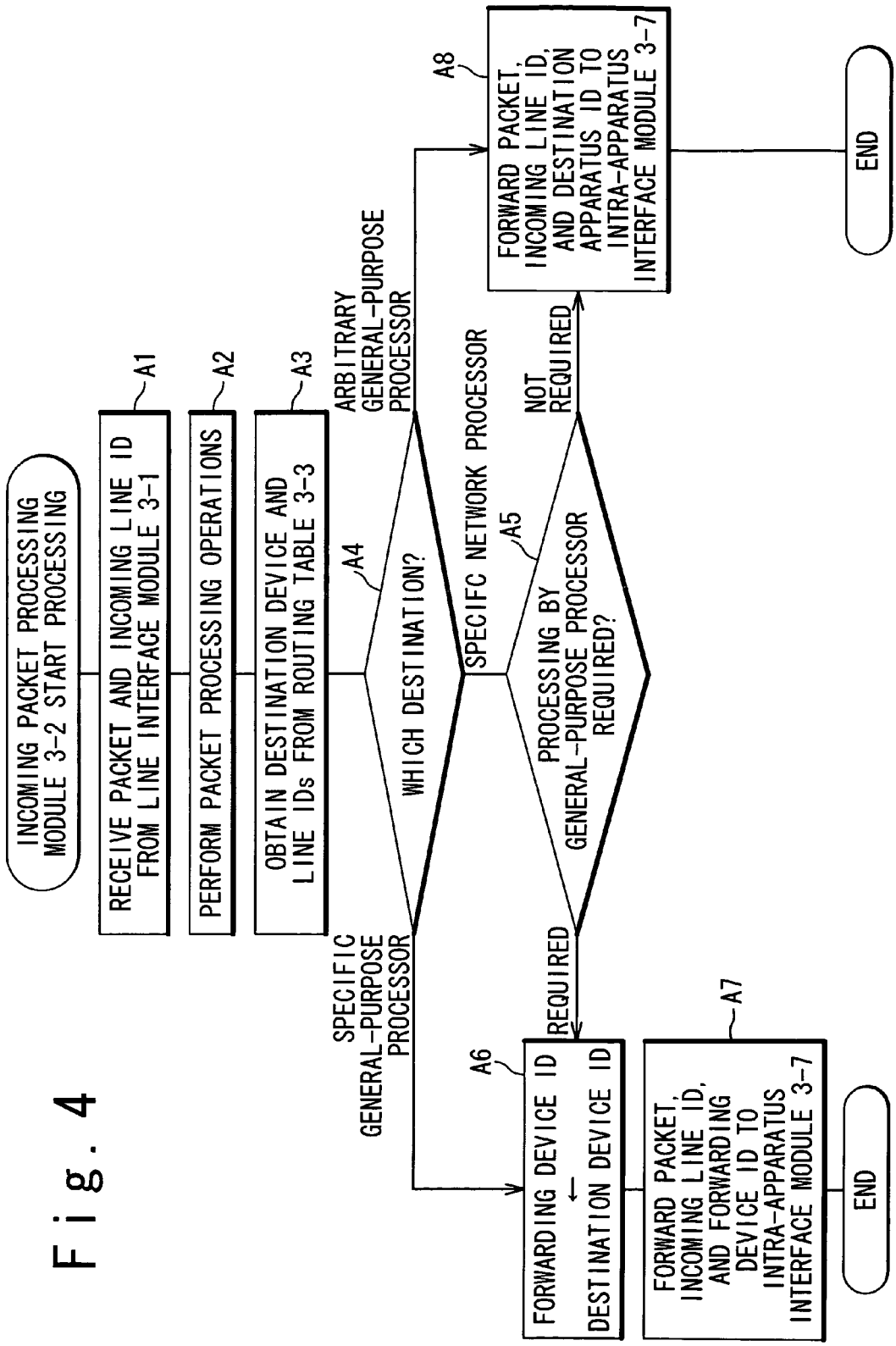
FIG. 4 is a flowchart illustrating operations of incoming packet processing modules within the network processors.

On receiving the forward packet and incoming line ID "41", as shown in FIG. 4, the incoming packet processing module 3-2 within the network processor NP4 performs desired packet processing operations at Steps A1, and A2.

After performing the packet processing operations, at Step A3, the incoming packet processing module 3-2 obtains a destination device ID of "5" and a destination line ID of "51" that are associated with the destination IP address "192.51.1.1" of the forward packet from the routing table 3-3 (See FIG. 11).

In response to obtaining the destination device ID of "5", at Step A4, the incoming packet processing module 3-2 determines that the received forward packet is to be forwarded to the network processor NP5, which is associated with the destination device ID "5".

At Step A5, the incoming packet processing module 3-2 then determines whether the forward packet requires processing by any general-purpose processor, on the basis of the contents of the option field within the packet header of the forward packet.

If the forward packet requires processing by any general-purpose processor, the incoming packet processing module 3-2 forwards the forward packet, the associated incoming line ID "41", and the destination device ID "5" to the incoming side session management module 3-4 at Step A8. Otherwise, the procedure jumps to Steps A6, and A7. In this embodiment, it is assumed that the forward packet requires processing by the general-purpose processors. Therefore, the procedure goes on to Step A8.

Figure 5:
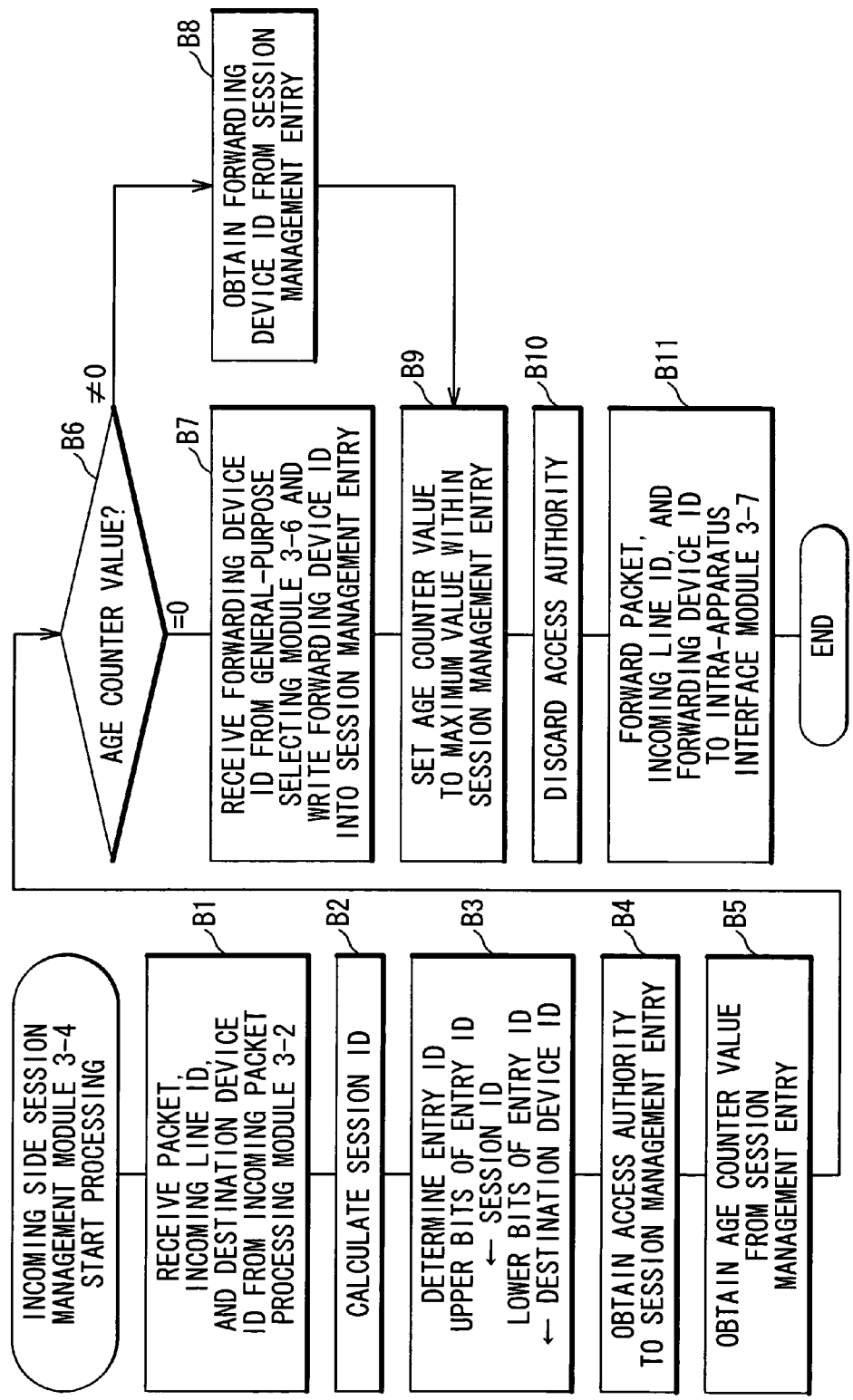
FIG. 5 is a flowchart illustrating operations of incoming side session control modules within the network processors.

On receiving the forward packet and associated interface parameters, as shown in FIG. 5, the incoming side session management module 3-4 calculates a session ID associated with the forward packet from the source IP address of "192.41.1.1", the destination IP address of "192.51.1.1", the source port number of "5632", and the destination port number of "25", using a hash function at Steps B1 and B2.

In detail, as shown in FIG. 7, calculating the session ID begins with determining the arguments A1 thorough A4 at Step D1. The argument A1 is determined as being smaller one of the source and destination IP addresses, while the argument A2 determined as being larger one of the source and destination IP addresses. The arguments A3 and A4 are reset to "0". The incoming side session management module 3-4 then determines the packet format of the forward packet at Steps D2, D3 . . . , and determines the arguments A3 and A4 depending the packet format at Steps D4, D5 . . . . In this embodiment, since the forward packet is a TCP packet, the procedure goes on to Step D4; the argument A3 is determined as being smaller one of the source and destination port numbers, while the argument A4 is determined as being larger one of the source and destination port numbers. Finally, the session ID is calculated using the hash function and the arguments A1 through A4 at Step D6. In this embodiment, the hash function returns the lower 8 bits of the sum of the arguments A1 to A4 as the hash value, and this results in that the calculated session ID is "0x1B".

Referring back to FIG. 5, after calculating the session ID, the incoming side session management module 3-4 determines an entry ID from the session ID "OxlB" and the destination device ID "5" at Step B3. In this embodiment, the entry ID is determined so that the resultant entry ID includes the session ID in the upper eight bits, and the destination device ID in the lower four bits. This results in that the resultant entry ID is "0x1B5".

Determining the entry ID in this procedure effectively allows different sessions to be associated with different entry IDs while reducing the size of the session management table 3-5. Using the hash function for calculating the session ID effectively reduces the size of the session management table 3-5. Additionally, and incorporating the destination device ID into the entry ID effectively reduces probabilities that different sessions are associated with the same entry ID.

After determining the entry ID of "0x1B5", the incoming side session management module 3-4 obtains the assess authority for the entry identified by the entry ID "0x1B5" at Step B4, and reads out the associated age counter value at Step B5. In this embodiment, the associated age counter value is initially reset to "0", and the associated entry is initially invalidated. In response to the associated entry being invalidated, the general-purpose processor 3-6 selects a destined processor to which the forward packet is to be forwarded out of the general-purpose processors CPU1 to CPU3. The incoming side session management module 3-4 receives the forwarding device ID identifying the destined general-purpose processor from the general-purpose processor 3-6. In this embodiment, the general-purpose processor CPU1 is selected as the destined general-purpose processor, and the incoming side session management module 3-4 obtains the forwarding device ID of "1" from the general-purpose processor selecting module 3-6. The incoming side session management module 3-4 then updates the forwarding device ID within the entry associated with the entry ID "0x1B5" to the forwarding device ID "1" received from the general-purpose processor selecting module 3-6 at Step B7, and also sets the associated age counter value to the maximum value to validate the associated entry at Step B9. As described above, the age counter value is decremented by the aging module 3-10 at constant time intervals.

After discarding the access authority at Step B10, the incoming side session management module 3-4 finally forwards the forward packet, the incoming line ID "41", and the destination device ID "1" to the intra-apparatus interface module 3-7 at Step B11.

As shown in FIG. 8, the intra-apparatus interface module 3-7 forwards the forward packet and associated interface parameters to the general-purpose processor CPU1, which is the destined general-purpose processor for the forward packet at Step E1 to E3, and E5. The forwarded interface parameters includes the incoming line ID "41", and the incoming device ID of "4" identifying the network processor NP4, which receives the forward packet.

It should be noted that, when the received destination device ID indicates the network processor NP4, the procedure goes on to Step E4 instead of Step E5, and the intra-apparatus interface module 3-7 forwards the forward packet and the destination line ID to the outgoing side packet processing module 3-7.

It should be additionally noted that, when the received destination device ID indicates any other network processor, the procedure goes on to Steps E6 and E7, and the intra-apparatus interface module 3-7 determines the originating device ID as being the incoming device ID, and forwards the forward packet, the destination line ID, the originating device ID, and the incoming device ID to the network processor identified by the received destination device ID.

The intra-apparatus interface module 2-4 within the general-purpose processor CPU1 encapsulates the forward packet, the incoming device ID "4", and the incoming line ID "41" into a data structure, and forwards the data structure to the protocol processing module 2-2.

The protocol module 2-2 performs desired processing operations on the forward packet, and then obtains the destination line ID and device ID associated with the destination IP address from the routing table 2-3. In this embodiment, the protocol module 2-2 obtains the destination line ID of "51" identifying the destination line interface IF51, and destination device ID "5", which are associated with the destination IP address of "192.51.1.1". The protocol module 2-2 forwards a data structure including the destination line ID and device ID, and the incoming device ID to the intra-apparatus interface module 2-4.

The intra-apparatus interface module 2-4 within the general-purpose processor CPU1 obtains the incoming device ID "4", and the destination line ID "51" from the received data structure, and forwards the forward packet and associated interface parameters to the network processor NP5, the interface parameters including the incoming device ID "4", the destination line ID "51", and the originating device ID "1", which is the device ID of the own processor, that is, the general-purpose processor CPU1.

The intra-apparatus interface module 3-7 within the network processor NP5 forwards the received packet and interface parameters, including the destination line ID "51", the incoming device ID "4", and the originating device ID "1" to the outgoing side session management module 3-8 at Steps F1 through F4. It should be noted that the procedure goes on to Step F4, because the intra-apparatus interface module 3-7 determines that the received originating device ID is associated with the general-purpose processor CPU1 at Step F2, and also determines that the incoming device ID is not "0" at Step F3.

Figure 6:
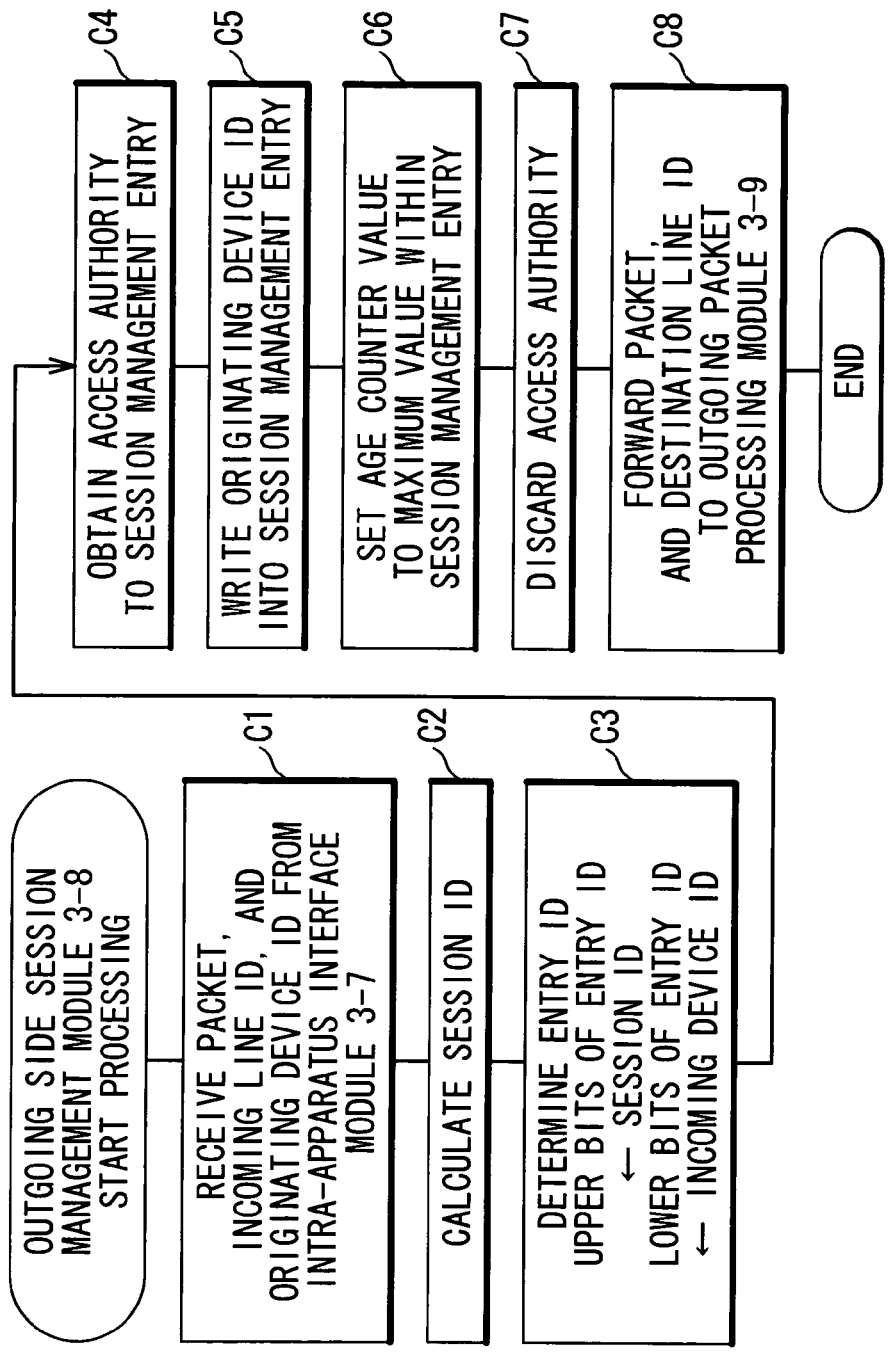
FIG. 6 is a flowchart illustrating operations of outgoing side session control modules within the network processors.

On receiving the forward packet, the incoming device ID "4", and the originating device ID "1", as shown in FIG. 6, the outgoing side session management module 3-8 calculates an session ID at Steps C1, and C2, from the source IP address of "192.41.1.1", the destination IP address of "192.51.1.1", the source port number of "5632", and the destination port number of "25", which are described within the packet header of the forward packet. The calculation of the session ID is performed in accordance with the procedure of FIG. 7, and the resultant session ID is "0x1B". This is followed by determining an entry ID to include the session ID in the upper eight bits and the incoming device ID "4" in the lower four bits at Step C3. The resultant entry ID is "0x1B4".

After obtaining the access authority for the entry identified by the entry ID of "0x1B4" at Step C4, the outgoing side session management module 3-5 then updates the forwarding device ID within the entry associated with the entry ID "0x1B4" to the originating device ID "1" received from the intra-apparatus interface module 3-7 at Step C5, and also sets the associated age counter value to the maximum value to validate the associated entry at Step C6.

After discarding the access authority at Step C7, the outgoing side session management module 3-9 finally forwards the forward packet, and the destination line ID "51" to the outgoing packet processing module 3-9 at Step C8.

The outgoing packet processing module 3-9 forwards the forward packet and the destination line ID "51" to the line interface module 3-1 after performing processing operations in connection with packet forwarding. The line interface module 3-1 forwards the forward packet to the physical line interface IF51 in response to receiving destination line ID "51", which is associated with the physical line interface IF51. The physical line interface IF51 transmits the forward packet to the responding host H51 over the network N3.

(Packet Transmission in the Reverse Direction during Session S1)

In response to the forward packet from the requesting host H41, the responding host H51 sends to the requesting host H41, an IP packet, which is referred to as a reverse packet hereinafter, having a source IP address of "192.51.1.1", a destination IP address of "192.41.1.1", a source port number of "25", and a destination port number of "5632". The reverse packet is transmitted over the network N3 to the physical line inter face IF51, which is accommodated by the network processor NP5 within the packet transfer apparatus 1.

The line interface module 3-1 within the network processor NP5 receives the reverse packet from the physical line interface IF51, and forwards the reverse packet and the incoming line ID of "51" to the incoming packet processing module 3-2. It should be noted that the incoming line ID "51" is associated with the incoming physical line interface IF51.

As shown in FIG. 4, at Steps A1 to A3, the incoming packet processing module 3-2 obtains the destination device ID of "4", and the destination line ID of "41" which are associated with the destination IP address "192.41.1.1" described within the reverse packet, from the routing table 3-3 (See FIG. 11). The incoming packet processing module 3-2 determines the destined processor of the reverse packet at Step A4, and also determines whether the reverse packet requires processing by any general-purpose processor at Step A5. In this embodiment, the incoming packet processing module 3-2 determines that the destined processor is the network processor NP4, and that the reverse packet requires processing by any general-purpose processor. The incoming packet processing module 3-2 forwards the reverse packet, the incoming line ID "41", and the destination device ID "4" to the incoming side session management module 3-4 at Step A8.

Referring FIG. 5, upon receiving the reverse packet, the incoming line ID "41", and the destination device ID "4" at Step B1, the incoming side session management module 3-4 calculates an session ID at Step B2 in accordance with the procedure of FIG. 7, from the source IP address "192.51.1.1", the destination IP address "192.41.1.1", the source port number "25", and the destination port number "5632", which are described within the reverse packet.

The resultant session ID is "0x1B", which is identical to the session ID obtained during the packet transmission in the forward direction, because the procedure for calculating the session IDs is defined so that the source and destination IP addresses commute with each other, and the source and destination port numbers commute with each other. Specifically, at Step D1, the argument A1 of the hash function is defined as being the smaller one of the source and destination IP addresses, while the argument A2 is defined as being the larger one. Correspondingly, at Step D4, the argument A3 is defined as being the smaller one of the source and destination port numbers, while the argument A4 is defined as being the larger one. The session IDs are defined using the hash function with the arguments A1 through A4. This allows the source and destination IP addresses to commute with each other, and the source and destination port numbers to commute with each other.

After calculating the session ID, the incoming side session management module 3-4 determines an entry ID from the session ID and the received destination device ID "4" so that the calculated entry ID includes the session ID in the upper eight bits, and the destination device ID "4" in the lower four bits. The resultant entry ID is "0x1B4", which is identical to the entry ID obtained by the network processor NP5 during the packet transmission in the forward direction.

After obtaining the access authority for the session management entry associated with the calculated entry ID "0x1B4" within the session management table 3-5 at Step B4, the incoming side session management module 3-4 then accesses to the entry identified by the entry ID "0x1B4" at Step B5. Since the aforementioned packet transmission in the forward direction prepares the age counter value associated with the entry ID "0x1B4" to be not "0", and the associated forwarding device ID to be "1", the incoming side session management module 3-4 obtains the forwarding device ID of "1" at Steps B6 and B8.

This is followed by setting the associated age counter value to the maximum value at Step B9. After discarding the access authority at Step B10, the incoming side session management module 3-4 then forwards the reverse packet, the incoming line ID "51", and the forwarding device ID "1" to the intra-apparatus interface module 3-7 at Step B11.

With reference to FIG. 8, at Steps E1 to E3 and E5, the intra-apparatus interface module 3-7 forwards the received reverse packet and associated interface parameters to the general purpose processor CPU1, which is associated with the forwarding device ID "1", the interface parameters including the incoming line ID "51", and the incoming device ID of "5" to indicate that the network processor NP5 receives the reverse packet.

The intra-apparatus interface module 2-4 within the general purpose processor CPU1 receives and encapsulates the reverse packet, the incoming device ID "5", and the incoming line ID "51" into a data structure, and forwards the data structure to the protocol processing module 2-2.

The protocol processing module 2-2 performs desired processing operations on the reverse packet, and obtains from the routing table 2-3 the destination line ID of "41", and the destination device ID of "4", which are associated with the destination IP address of "192.41.1.1" described in the reverse packet. The protocol processing module 2-2 then encapsulates the reverse packet and the destination line ID and device ID into a data structure and forwards the data structure to the intra-apparatus interface module 2-4.

The intra-apparatus interface module 2-4 obtains the incoming device ID of "5", the destination device ID of "41" from the data structure received from the protocol processing module 2-2, and determines the originating device ID as being the device ID "1", which is associated with the owner processor, that is, the general-purpose processor CPU1. The intra-apparatus interface module 2-4 then forwards the reverse packet and associated interface parameters to the network processor NP4, the interface parameters including the incoming device ID "5", the destination line ID "41", and the originating device ID "1".

As shown in FIG. 9, the intra-apparatus interface module 3-7 within the network processor NP4 forwards the reverse packet, the destination line ID "41", the incoming device ID "5", and the originating device ID "1" received from the general-purpose processor CPU1 to the outgoing side session management module 3-8 at Steps F1 through F4.

As shown in FIG. 6, the outgoing side session management module 3-8 calculates an session ID from the source IP address of "192.51.1.1", the destination IP address of "192.41.1.1", the source port number "25", and the destination port number "5632" which are described in the reverse packet at Steps C1 and C2. The resultant session ID is "0x1B".

This is followed by determining an entry ID to include the session ID in the upper eight bits, and incoming device ID in the lower four bits at Step C3. The resultant entry ID is "0x1B5".

The outgoing side session management module 3-8 updates the forwarding device ID within the entry associated with the entry ID "0x1B5" to the received originating device ID "1" at Steps C4 and C5. Additionally, the outgoing side session management module 3-8 sets the associated age counter value to the maximum value at Step C6. Finally, the outgoing side session management module 3-8 forwards the reverse packet and the destination line ID "41" to the outgoing packet processing module 3-9 at Steps C7 and C8.

The outgoing packet processing module 3-9 forwards the reverse packet and the destination line ID "41" to the line interface module 3-1 after performing processing operations in connection with packet forwarding. The line interface module 3-1 forwards the reverse packet to the physical line interface IF41 in response to receiving the destination line ID "41", which is associated with the physical line interface IF41. The physical line interface IF41 transmits the reverse packet to the requesting host H41 over the network N1.

It should be noted that the forwarding device ID "1" is contained in both of the session management entry identified by the entry ID "0x1B5" within the network processor NP4, and the session management entry identified by the entry ID "0x1B4" within the network processor NP5. This allows the packets associated with the session S1 to be transmitted between the hosts 41 and 51 through the general-purpose processor CPU1 before these entries are invalidated by the age counter value reaching "0". This enables the packets associated with the session S1 to be processed by the same general-purpose processor.

Suspending packet transmission of the session S1 for a predetermined period allows the aging module 3-10 to decrease the associated age counter values down to "0" to invalidate the associated entries. After the associated entries are invalidated, the incoming side session management module 3-4 redetermines the destined general-purpose processor when the packet transmission of the session S1 is restarted.

(Packet Transmission in the Forward Direction during Session S2)

With reference to FIG. 12, the session S1 is established between the hosts H42 and H61. The hose H42 operates as a requesting host, while the host H61 operates as a responding host. During the session S2, TCP packet transmissions are performed using the requestor IP address of "192.42.1.1", the requestor port number of "1753", the responder IP address of "192.51.1.1", and the responder port number of "110".

The session S2 begins with sending an IP packet, which is referred to as a forward packet hereinafter, from the requesting host H42 to the responding host H61. The forward packet has a source IP address of "192.42.1.1", a destination IP address of "192.61.1.1", a source port number of "1753", and a destination port number of "110". The forward packet is transmitted to the network processor NP4 of the packet transfer apparatus 1 over the network N2.

The line interface module 3-1 within the network processor NP4 receives the forward packet from the physical line interface IF42, and forwards the forward packet and an incoming line ID of "42", which is associated with the interface IF42, to the incoming packet processing module 3-2.

On receiving the forward packet and incoming line ID "42", as shown in FIG. 4, the incoming packet processing module 3-2 within the network processor NP4 performs desired packet processing operations at Steps A1, and A2.

After performing the packet processing operations, at Step A3, the incoming packet processing module 3-2 obtains a destination device ID of "6" and a destination line ID of "61" that are associated with the destination IP address "192.61.1.1" of the forward packet from the routing table 3-3 (See FIG. 11).

In response to obtaining the destination device ID of "5", at Step A4, the incoming packet processing module 3-2 determines that the received forward packet is to be forwarded to the network processor NP6 and that the forward packet requires processing by any general-purpose processor at Step A5, and forwards the forward packet, the associated incoming line ID "42", and the destination device ID "6" to the incoming side session management module 3-4 at Step A8.

On receiving the forward packet and associated interface parameters, as shown in FIG. 5, the incoming side session management module 3-4 calculates a session ID associated with the forward packet from the source IP address of "192.42.1.1", the destination IP address of "192.61.1.1", the source port number of "1753", and the destination port number of "110" at Steps B1 and B2. The resultant session ID is "0x49".

Referring to FIG. 5, after calculating the session ID, the incoming side session management module 3-4 determines an entry ID to include the session ID in the upper eight bits, and the destination device ID in the lower four bits at Step B3. The resultant entry ID is "0x496".

After determining the entry ID of "0x496", the incoming side session management module 3-4 accesses to the entry associated with the entry ID "0x496" at Steps B4 and B5. Since the associated age counter value is initially reset to "0", the entry identified by the entry ID "0x496" is invalidated at Step B6. In response to the associated entry being invalidated, the incoming side session management module 3-4 obtains a forwarding device ID of a destined processor selected out of the general-purpose processors CPU1 to CPU3 from the general-purpose processor selecting module 3-6. In this embodiment, the general-purpose processor CPU3 is selected as the destined processor, and thus the incoming side session management module 3-4 obtains the forwarding device ID "3". The incoming side session management module 3-4 then updates the forwarding device ID within the entry associated with the entry ID "0x496" to the device ID "3" received from the general-purpose processor selecting module 3-6 at Step B7, and also sets the associated age counter value to the maximum value to validate the associated entry at Step B9. After discarding the access authority at Step B10, the incoming side session management module 3-4 finally forwards the forward packet, the incoming line ID "42", and the destination device ID "3" to the intra-apparatus interface module 3-7 at Step B11.

As shown in FIG. 8, the intra-apparatus interface module 3-7 forwards the forward packet and associated interface parameters to the general-purpose processor CPU3, which is the destined general-purpose processor for the forward packet at Step E1 to E3, and E5. The forwarded interface parameters includes the incoming line ID "42", and the incoming device ID of "4", which indicates that the network processor NP4 receives the forward packet.

The intra-apparatus interface module 2-4 within the general-purpose processor CPU3 encapsulates the forward packet, the incoming device ID "4", and the incoming line ID "42" into a data structure, and forwards the data structure to the protocol processing module 2-2.

The protocol module 2-2 performs desired processing operations on the forward packet, and then obtains the destination line ID "61" and the destination device ID "6", which are associated with the destination IP address "192.61.1.1" of the forward packet, from the routing table 2-3. The protocol module 2-2 forwards a data structure including the forward packet, the destination line ID "61", and the destination device ID "6" to the intra-apparatus interface module 2-4.

The intra-apparatus interface module 2-4 within the general-purpose processor CPU3 obtains the incoming device ID "4", and the destination line ID "61" from the received data structure, and forwards the forward packet and associated interface parameters to the network processor NP6, the interface parameters including the incoming device ID "4", the destination line ID "61", and the originating device ID "3", which is the device ID of the own processor, that is, the general-purpose processor CPU3.

The intra-apparatus interface module 3-7 within the network processor NP6 forwards the received packet and interface parameters, including the destination line ID "61", the incoming device ID "4", and the originating device ID "3" to the outgoing side session management module 3-8 at Steps F1 through F4.

As shown in FIG. 6, the outgoing side session management module 3-8 calculates an session ID at Steps C1 and C2, from the source IP address of "192.42.1.1", the destination IP address of "192.61.1.1", the source port number of "1753", and the destination port number of "110", which are described within the packet header of the forward packet. The calculation of the session ID is performed in accordance with the procedure of FIG. 7, and the resultant session ID is "0x49". This is followed by determining an entry ID to include the session ID "0x49" in the upper eight bits and the incoming device ID "4" in the lower four bits at Step C3. The resultant entry ID is "0x494".

After obtaining the access authority for the entry identified by the entry ID of "0x494" at Step C4, the outgoing side session management module 3-5 then updates the forwarding device ID within the entry associated with the entry ID "0x494" to the originating device ID "3" received from the intra-apparatus interface module 3-7 at Step C5, and also sets the associated age counter value to the maximum value to validate the associated entry at Step C6.

After discarding the access authority at Step C7, the outgoing side session management module 3-9 finally forwards the forward packet, and the destination line ID "61" to the outgoing packet processing module 3-9 at Step C8.

The outgoing packet processing module 3-9 forwards the forward packet and the destination line ID "61" to the line interface module 3-1 after performing processing operations in connection with packet forwarding. The line interface module 3-1 forwards the forward packet to the physical line interface IF61 in response to receiving destination line ID "61", which is associated with the physical line interface IF61. The physical line interface IF61 transmits the forward packet to the responding host H61 over the network N5.

(Packet Transmission in the Reverse Direction during Session S2)

In response to the forward packet from the requesting host H42, the responding host H61 sends to the requesting host H42, an IP packet, which is referred to as a reverse packet hereinafter, having a source IP address of "192.61.1.1", a destination IP address of "192.42.1.1", a source port number of "110", and a destination port number of "1753". The reverse packet is transmitted over the network N5 to the physical line inter face IF61, which is accommodated by the network processor NP6 within the packet transfer apparatus 1.

The line interface module 3-1 within the network processor NP6 receives the reverse packet from the physical line interface IF61, and forwards the reverse packet and the incoming line ID of "61" to the incoming packet processing module 3-2.

As shown in FIG. 4, at Steps A1 to A3, the incoming packet processing module 3-2 obtains the destination device ID of "4", and the destination line ID of "42" which are associated with the destination IP address "192.42.1.1" described within the reverse packet, from the routing table 3-3 (See FIG. 11). The incoming packet processing module 3-2 determines that the destined processor of the reverse packet is the network processor NP4, and that the reverse packet requires processing by any general-purpose processor. The incoming packet processing module 3-2 forwards the reverse packet, the incoming line ID "62", and the destination device ID "4" to the incoming side session management module 3-4 at Step A8.

Referring FIG. 5, the incoming side session management module 3-4 calculates an session ID at Steps B1 and B2 in accordance with the procedure of FIG. 7, from the source IP address "192.51.1.1", the destination IP address "192.41.1.1", the source port number "25", and the destination port number "5632", which are described within the reverse packet. The resultant session ID is "0x49". After calculating the session ID, the incoming side session management module 3-4 determines an entry ID from the session ID and the received destination device ID "4" so that the calculated entry ID includes the session ID in the upper eight bits, and the destination device ID "4" in the lower four bits. The resultant entry ID is "0x494".

After obtaining the access authority for the session management entry associated with the calculated entry ID "0x494" within the session management table 3-5 at Step B4, the incoming side session management module 3-4 then accesses to the entry identified by the entry ID "0x494" at Step B5. Since the aforementioned packet transmission in the forward direction prepares the age counter value associated with the entry ID "0x494" to be not "0", and the associated forwarding device ID to be "3", the incoming side session management module 3-4 obtains the forwarding device ID of "3" at Steps B6 and B8.

This is followed by setting the associated age counter value to the maximum value at Step B9. After discarding the access authority at Step B10, the incoming side session management module 3-4 then forwards the reverse packet, the incoming line ID "61", and the forwarding device ID "3" to the intra-apparatus interface module 3-7 at Step B11.

With reference to FIG. 8, at Steps E1 to E3 and E5, the intra-apparatus interface module 3-7 forwards the received reverse packet and associated interface parameters to the general purpose processor CPU3, which is associated with the forwarding device ID "3", the interface parameters including the incoming line ID "61", and the incoming device ID of "6" which indicates that the network processor NP6 receives the reverse packet.

The intra-apparatus interface module 2-4 within the general purpose processor CPU3 encapsulates the reverse packet, the incoming device ID "5", and the incoming line ID "51" received from the network processor NP6 into a data structure, and forwards the data structure to the protocol processing module 2-2.

The protocol processing module 2-2 performs desired processing operations on the reverse packet, and obtains from the routing table 2-3 the destination line ID of "42", and the destination device ID of "4", which are associated with the destination IP address of "192.42.1.1" described in the reverse packet. The protocol processing module 2-2 then encapsulates the reverse packet and the destination line ID and device ID into a data structure and forwards the data structure to the intra-apparatus interface module 2-4.

The intra-apparatus interface module 2-4 obtains the incoming device ID of "6", the destination device ID of "42" from the data structure received from the protocol processing module 2-2, and determines the originating device ID as being the device ID "3", which is associated with the owner processor, that is, the general-purpose processor CPU3. The intra-apparatus interface module 2-4 then forwards the reverse packet and associated interface parameters to the network processor NP4, the interface parameters including the incoming device ID "6", the destination line ID "42", and the originating device ID "3".

As shown in FIG. 9, the intra-apparatus interface module 3-7 within the network processor NP4 forwards the reverse packet, the destination line ID "42", the incoming device ID "6", and the originating device ID "3" received from the general-purpose processor CPU3 to the outgoing side session management module 3-8 at Steps F1 through F4.

As shown in FIG. 6, the outgoing side session management module 3-8 calculates an session ID in accordance with the procedure of FIG. 7 from the source IP address of "192.61.1.1", the destination IP address of "192.42.1.1", the source port number "110", and the destination port number "1753" which are described in the reverse packet at Steps C1 and C2. The resultant session ID is "0x49".

This is followed by determining an entry ID to include the session ID in the upper eight bits, and incoming device ID in the lower four bits at Step C3. The resultant entry ID is "0x496".

The outgoing side session management module 3-8 then updates the forwarding device ID within the entry associated with the entry ID "0x496" to the received originating device ID "3" at Steps C4 and C5. Additionally, the outgoing side session management module 3-8 sets the associated age counter value to the maximum value at Step C6. Finally, the outgoing side session management module 3-8 forwards the reverse packet and the destination line ID "42" to the outgoing packet processing module 3-9 at Steps C7 and C8.

The outgoing packet processing module 3-9 forwards the reverse packet and the destination line ID "42" to the line interface module 3-1 after performing processing operations in connection with packet forwarding. The line interface module 3-1 forwards the reverse packet to the physical line interface IF42 in response to receiving the destination line ID "42", which is associated with the physical line interface IF42. The physical line interface IF42 transmits the reverse packet to the requesting host H42 over the network N2.

It should be noted that the forwarding device ID "3" is contained in both of the session management entry identified by the entry ID "0x496" within the network processor NP4, and the session management entry identified by the entry ID "0x494" within the network processor NP6. This allows the packets associated with the session S2 to be transmitted between the hosts 42 and 61 through the general-purpose processor CPU3 before these entries are invalidated by the age counter value reaching "0". This enables the packets associated with the session S1 to be processed by the same general-purpose processor.

Suspending packet transmission of the session S1 for a predetermined period allows the aging module 3-10 to decrease the associated age counter values down to "0" to invalidate the associated entries. After the associated entries are invalidated, the incoming side session management module 3-4 redetermines the destined general-purpose processor when the packet transmission of the session S2 is restarted.

(Packet Transmission in the Forward Direction during Session S3)

With reference to FIG. 13, the session S3 is established between the host H52 and the general-purpose processor CPU2, while the session S4 is established between the general-purpose processor CPU2 and the host 62. The sessions S3 and S4 aims to achieve application gateways using the packet transfer apparatus 1 between the hosts H52 and H62.

The session S3 involves packet transmissions between the host H52 and the packet transfer apparatus 1, the host H52 operating as a requesting host. During the session S3, TCP packet transmissions are performed using the requestor IP address of "192.52.1.1", the requestor port number of "1959", the responder IP address of "192.52.0.4", and the responder port number of "8080".

The session S3 begins with sending an IP packet, which is referred to as a forward packet hereinafter, from the requesting host H52 to the packet transfer apparatus 1. The forward packet has a source IP address of "192.52.1.1", a destination IP address of "192.52.0.4", a source port number of "1959", and a destination port number of "8080". The forward packet is transmitted to the network processor NP5 of the packet transfer apparatus 1 over the network N4.

It should be noted that the destination IP address of the forward packet is the secondary IP address, which is shared by the general-purpose processors CPU1 to CPU3. This implies that the destination of the forward packet is selectable out of the general-purpose processors CPU1 to CPU3.

The line interface module 3-1 within the network processor NP5 receives the forward packet from the physical line interface IF52, and forwards the forward packet and an incoming line ID of "52", which is associated with the interface IF52, to the incoming packet processing module 3-2.

On receiving the forward packet and incoming line ID "52", as shown in FIG. 4, the incoming packet processing module 3-2 within the network processor NP5 performs desired packet processing operations at Steps A1, and A2.

After performing the packet processing operations, at Step A3, the incoming packet processing module 3-2 obtains a destination device ID of "0", which is associated with the destination IP address "192.52.0.4" of the forward packet, from the routing table 3-3 (See FIG. 11).

In response to obtaining the destination device ID of "0", at Step A4, the incoming packet processing module 3-2 determines that the received forward packet is to be forwarded to arbitrary one of the general-purpose processors CPU1 to CPU3, and forwards the forward packet, the associated incoming line ID "52", and the destination device ID "0" to the incoming side session management module 3-4 at Step A8.

On receiving the forward packet and associated interface parameters, as shown in FIG. 5, the incoming side session management module 3-4 calculates a session ID associated with the forward packet from the source IP address of "192.52.1.1", the destination IP address of "192.52.0.4", the source port number of "1959", and the destination port number of "8080" at Steps B1 and B2. The resultant session ID is "0x3C".

After calculating the session ID, the incoming side session management module 3-4 determines an entry ID to include the session ID in the upper eight bits, and the destination device ID in the lower four bits at Step B3. The resultant entry ID is "0x3C0".

After determining the entry ID of "0x3C0", the incoming side session management module 3-4 accesses to the entry associated with the entry ID "0x3C0" at Steps B4 and B5. Since the associated age counter value is initially reset to "0", the entry identified by the entry ID "0x3C0" is invalidated at Step B6. In response to the associated entry being invalidated, the incoming side session management module 3-4 obtains a forwarding device ID of a destined processor selected out of the general-purpose processors CPU1 to CPU3 from the general-purpose processor selecting module 3-6. In this embodiment, the general-purpose processor CPU2 is selected as the destined processor, and thus the incoming side session management module 3-4 obtains the forwarding device ID "2". The incoming side session management module 3-4 then updates the forwarding device ID within the entry associated with the entry ID "0x3C0" to the device ID "2" received from the general-purpose processor selecting module 3-6 at Step B7, and also sets the associated age counter value to the maximum value to validate the associated entry at Step B9. After discarding the access authority at Step B10, the incoming side session management module 3-4 finally forwards the forward packet, the incoming line ID "52", and the destination device ID "2" to the intra-apparatus interface module 3-7 at Step B11.

As shown in FIG. 8, the intra-apparatus interface module 3-7 forwards the forward packet and associated interface parameters to the general-purpose processor CPU2, which is the destined general-purpose processor for the forward packet, at Step E1 to E3, and E5. The forwarded interface parameters includes the incoming line ID "52", and the incoming device ID of "5", which indicates that the network processor NP5 receives the forward packet.

The intra-apparatus interface module 2-4 within the general-purpose processor CPU2 encapsulates the forward packet, the incoming device ID "5", and the incoming line ID "52" into a data structure, and forwards the data structure to the protocol processing module 2-2.

In response to the destination IP address of the forward packet being identical to the secondary IP address associated with the physical line interface IF52, the protocol processing module 2-2 terminates the TCP forward packet, and forwards the user data encapsulated into the forward packet to the application module associated with the destination port number "8080". In this embodiment, the application module 2-1-1 receives the user data within the forward packet.

(Packet Transmission in the Reverse Direction during Session S3)

In response to the forward packet from the requesting host H52, which is transmitted in the session S3 in the forward direction, the application module 2-1-1 within the general-purpose processor CPU2 generates data to be transmitted to the host H52.

The protocol processing module 2-2 encapsulates the data received from the application module 2-1-1 into an TCP/IP packet having a source IP address of "192.52.0.4", a destination IP address of "192.52.1.1", a source port number of "8080", and a destination port number of "1959". The TCP/IP packet is referred to as a reverse packet, hereinafter.

The protocol processing module 2-2 performs desired processing operations on the reverse packet, and obtains from the routing table 2-3 the destination line ID of "52", and the destination device ID of "5", which are associated with the destination IP address of "192.52.1.1" described in the reverse packet. The protocol processing module 2-2 then encapsulates the reverse packet and the destination line ID and device ID into a data structure and forwards the data structure to the intra-apparatus interface module 2-4.

The intra-apparatus interface module 2-4 obtains the destination device ID of "52" from the data structure received from the protocol processing module 2-2, and determines the incoming device ID as being "0", and also determines the originating device ID as being the device ID "2", which is associated with the owner processor, that is, the general-purpose processor CPU2. The intra-apparatus interface module 2-4 then forwards the reverse packet and associated interface parameters to the network processor NP5, the interface parameters including the incoming device ID "0", the destination line ID "52", and the originating device ID "2".

In response to the received incoming device ID being "0", as shown in FIG. 9, the intra-apparatus interface module 3-7 within the network processor NP5 forwards the reverse packet, the destination line ID "52" to the outgoing packet processing module 3-9 at Steps F1 through F3 and F5.

After performing processing operations in connection with packet forwarding, the outgoing packet processing module 3-9 forwards the reverse packet and the destination line ID "52" to the line interface module 3-1. The line interface module 3-1 forwards the reverse packet to the physical line interface IF52 in response to receiving the destination line ID "52", which is associated with the physical line interface IF52. The physical line interface IF52 transmits the reverse packet to the requesting host H52 over the network N4.

It should be noted that the forwarding device ID "2" is contained in the session management entry identified by the entry ID "0x3C0" within the network processor NP5. This allows the packets transmitted from the requesting host H52 and associated with the session S3 to be forwarded to the general-purpose processor CPU2, before the associated entry is invalidated by the age counter value reaching "0".

(Packet Transmission in the Forward Direction during Session S4)

With reference to FIG. 13, the session S4 is established between the general-purpose processor CPU2 and the host 62. The general-purpose processor CPU2 operates as a requesting node, while the host 62 operates as a responding host.

The packet transmission during the session S4 in the forward direction begins with data preparation by one of the application modules 2-1-1 through 2-1-3 within the general-purpose processor CPU2. In this embodiment, the application module 2-1-1 generates data to be transmitted to the host H62.

The protocol processing module 2-2 encapsulates the data received from the application module 2-1-1 into an TCP/IP packet having a source IP address of "192.62.0.2", a destination IP address of "192.62.1.1", a source port number of "6709", and a destination port number of "80". The TCP/IP packet is referred to as a forward packet, hereinafter.

It should be noted that the source IP address of the forward packet is one of the primary IP addresses. This allows the responding host H62 to transmit a reverse packet to the general-purpose processor CPU2, which operates as the requesting node.

The protocol processing module 2-2 performs desired processing operations on the forward packet, and obtains from the routing table 2-3 the destination line ID of "62", and the destination device ID of "6", which are associated with the destination IP address of "192.62.1.1" described in the forward packet. The protocol processing module 2-2 then encapsulates the forward packet and the destination line ID and device ID into a data structure and forwards the data structure to the intra-apparatus interface module 2-4.

The intra-apparatus interface module 2-4 obtains the destination device ID of "62" from the data structure received from the protocol processing module 2-2, and determines the incoming device ID as being "0", and also determines the originating device ID as being the device ID "2", which is associated with the owner processor, that is, the general-purpose processor CPU2. The intra-apparatus interface module 2-4 then forwards the forward packet and associated interface parameters to the network processor NP6, the interface parameters including the incoming device ID "0", the destination line ID "62", and the originating device ID "2".

In response to the received incoming device ID being "0", as shown in FIG. 9, the intra-apparatus interface module 3-7 within the network processor NP6 forwards the forward packet, the destination line ID "62" to the outgoing packet processing module 3-9 at Steps F1 through F3 and F5.

After performing processing operations in connection with packet forwarding, the outgoing packet processing module 3-9 forwards the forward packet and the destination line ID "62" to the line interface module 3-1. The line interface module 3-1 forwards the forward packet to the physical line interface IF62 in response to receiving the destination line ID "62". The physical line interface IF62 transmits the reverse packet to the requesting host H62 over the network N6.

(Packet Transmission in the Reverse Direction during Session S4)

In response to the forward packet from the packet transfer apparatus 1, which is transmitted in the session S3 in the forward direction, the responding host 62 sends to the packet transfer apparatus 1 an IP packet having an source IP address of "192.62.1.1", a destination IP address of "192.62.0.2", a source port of "80", and a destination port of "6709", the IP packet being referred to as a reverse packet, hereinafter. The reverse packet is transmitted to the network processor NP6 of the packet transfer apparatus 1 over the network N6.

It should be noted that the destination IP address of the reverse packet is the primary IP address, which is associated with the general-purpose processor CPU2. As described later, this allows the reverse packet to be transmitted to the general-purpose processor CPU2.

The line interface module 3-1 within the network processor NP6 receives the reverse packet from the physical line interface IF62, and forwards the reverse packet and an incoming line ID of "62", which is associated with the interface IF62, to the incoming packet processing module 3-2.

On receiving the reverse packet and incoming line ID "62", as shown in FIG. 4, the incoming packet processing module 3-2 within the network processor NP6 performs desired packet processing operations at Steps A1, and A2.

After performing the packet processing operations, at Step A3, the incoming packet processing module 3-2 obtains a destination device ID of "2", which is associated with the destination IP address "192.62.0.2" of the reverse packet, from the routing table 3-3 (See FIG. 11).

In response to obtaining the destination device ID of "2", at Step A4, the incoming packet processing module 3-2 determines that the received reverse packet is to be forwarded to specific one of the general-purpose processors CPU1 to CPU3, more specifically, the general-purpose processor CPU2. The incoming packet processing module 3-2 determines the forwarding device ID as being the destination device ID "2", and forwards the reverse packet, the associated incoming line ID "62", and the forwarding device ID "2" to the intra-apparatus interface module 3-7 at Steps A4, A6, and A7.

As shown in FIG. 8, the intra-apparatus interface module 3-7 forwards the reverse packet and associated interface parameters to the general-purpose processor CPU2, which is the destined general-purpose processor identified by the forwarding device ID of "2" for the reverse packet, at Step E1 to E3, and E5. The forwarded interface parameters includes the incoming line ID "62", and the incoming device ID of "6", which indicates that the network processor NP6 receives the reverse packet.

The intra-apparatus interface module 2-4 within the general-purpose processor CPU2 encapsulates the reverse packet, the incoming device ID "6", and the incoming line ID "62" into a data structure, and forwards the data structure to the protocol processing module 2-2.

In response to the destination IP address of the reverse packet being identical to the primary IP address associated with the physical line interface IF62, the protocol processing module 2-2 terminates the TCP reverse packet, and forwards the user data encapsulated into the reverse packet to the application module associated with the destination port number "6709". In this embodiment, the application module 2-1-1 receives the user data within the reverse packet.

Although the session S4 does not use the session management table 3-5 for session control, all the packets associated with the session S4 from the host H62 are transmitted to the general-purpose processor CPU2 due to the use of the primary IP address specifically associated with the general-purpose processor CPU2.

FIG. 14 illustrates the contents of the session management tables 3-3 within the network processors NP4, NP5, and NP6 for the case when all of the aforementioned sessions S1, S2, S3, and S4 are established. It should be noted that the age counter values are continuously modified by the aging module 3-10, and thus, the age counter values are not limited to those illustrated in FIG. 14.

CONCLUSION

As described, the packet transfer apparatus in this embodiment allows the packets belonging to the same session to be forwarded to the same general-purpose processor and to be thereby processed by the same general-purpose processor.

This architecture has three advantages as described below. Firstly, the packet transfer apparatus effectively avoids the "packet out of order problems". Secondly, the packet transfer apparatus achieves appropriate dynamic control of filtering rules. For instance, the packet transfer apparatus effectively avoids undesirable packet missing. Let us consider the case that the first packet associated with a specific session, which includes the starting flag, is forward to a first general-purpose processor, while the responding packet for the first packet is forward to a second general-purpose processor. This results in that the second general-purpose processor undesirably discards the responding packet. The packet transfer apparatus in this embodiment allows the starting packet and responding packet to be forwarded to the same general-purpose processor to avoid undesirable packet missing. Finally, the packet transfer apparatus in this embodiment enables the application gateways with the associated sessions controlled appropriately.

Although the invention has been described in its preferred form with a certain degree of particularity, it is understood that the present disclosure of the preferred form has been changed in the details of construction and the combination and arrangement of parts may be resorted to without departing from the scope of the invention as hereinafter claimed.

It should be noted that the determination procedure of the entry IDs is not limited to the procedure disclosed herein, which involves calculating session IDs from source and destination IP addresses, and source and destination port addresses of target packets using a hash function, and determining entry IDs by incorporating the session IDs and the destination or incoming device IDs.

Additionally, the packet transfer apparatus may include only one network processor. In this case, the operations of the incoming and outgoing side session management module 3-4 and 3-8 may be modified as follows: With reference to FIG. 5, the incoming side session management module 3-4 may use the session IDs calculated at Step B2 as the entry IDs at Step B3. Additionally, with reference to FIG. 6, the outgoing side session management module 3-8 may use the session calculated at Step C2 as the entry IDs at Step C3, and also skip the procedure of Step C5.

What is claimed is:

1. A packet transfer apparatus comprising:
a plurality of general-purpose processors; and
a network processor adapted to forward packets belonging to a same session to a same one of said plurality of general-purpose processors, wherein:
said network processor includes a session management table containing session management entries, each of which is associated with a session and contains a device ID identifying a destined one of said general-purpose processors to which packets belonging to said associated session are to be forwarded,
said network processor is programmed to, upon receiving an incoming packet which requires processing by an arbitrary one of said general-purpose processors, when said session management entries include a validated session management entry associated with a session to which said incoming packet belongs, forward said incoming packet to said destined general-purpose processor identified by said device ID within said validated session management entry,
each of said session management entries further contains an entry ID associated with said session, and
said network processor is programmed:
to determine an entry ID using a hash function with source and destination IP addresses, and source and destination port numbers of said incoming packet used as arguments, and
to, when said session management entries include no validated session management entry containing said determined entry ID, prepare another validated session management entry containing said determined entry ID, and a device ID identifying destined general-purpose processor selected out of said general-purpose processors, and to forward said incoming packet to said destined general-purpose processors,
to, when said session management entries include a validated session management entry containing said determined entry ID, forward said incoming packet to said destined general-purpose processor identified by said device ID contained in said validated session management entry.

2. The packet transfer apparatus according to claim 1, wherein said network processor is programmed:
to, when said session management entries include no validated session management entry associated with said session to which said incoming packet belongs, select a destined one of said general-purpose processors to which said incoming packet is to be forwarded, and to prepare, within said session management table, another validated session management entry associated with said session to which said incoming packet belongs, said another session management entry including a device ID associated with said selected one of said general-purpose processors.

3. The packet transfer apparatus according to claim 1, wherein said network processor is programmed to, when receiving another incoming packet having a destination IP address associated with one of said general purpose processors, forward said another incoming packet to said associated one of said general purpose processors.

4. The packet transfer apparatus according to claim a 1, wherein each of said session management entries includes an age counter value indicating whether said session management entry is invalidated, wherein said network processor is programmed:
to modify said age counter values within said session management entries at constant time intervals towards a first predetermined value to thereby invalidate said session management entries,
to determine whether each of said session management entries is invalidated based on said associated age counter value, and
to, when said session management entries include said validated session management entry associated with said session to which said incoming packet belongs, set said age counter value within said associated validated session management entry to a second predetermined value.

5. The packet transfer apparatus according to claim 2, wherein said network processor is programmed to select a least-loaded one of said general-purpose processors as said destined general-purpose processor to which said incoming packet is to be forwarded.

6. The packet transfer apparatus according to claim 2, wherein said network processor is programmed to select said destined one of said general-purpose processors in a predetermined order.

7. The packet transfer apparatus according to claim 2, wherein said network processor is mounted on a board on which at least one of said general-purpose processors is mounted, and wherein said network processor is programmed to select said destined general-purpose processor out of said at least one of said general-purpose processors.

8. The packet transfer apparatus of claim 1, wherein said general-purpose processors function as control elements, each being configured to perform complex packet processing using a large memory and high level languages to support processing on a TCP (transmission control protocol) or UDP (united data processing) protocol at a layer 4 and above, and
said network processor comprises one of a plurality of network processors that function as forwarding elements, each said network processor being configured to perform simple packet processing using a small memory and low level languages to support processing on a TCP or UDP protocol at a layer 3 and below.

9. A packet transfer apparatus comprising:
a plurality of general-purpose processors; and
a plurality of network processors, each including a session management table containing session management entries, each of which contains an entry ID associated with a session, and a device ID identifying destined one of said general-purpose processors to which packets belonging to said associated session are to be forwarded, wherein each of said network processor is programmed:
to, when receiving an incoming packet that requires processing by arbitrary one of said general-purpose processors, determine an entry ID using a hash function with source and destination IP addresses, and source and destination port numbers of said incoming packet used as arguments, and
to, when said session management entries include no validated session management entry containing said determined entry ID, prepare another validated session management entry containing said determined entry ID, and a device ID identifying destined general-purpose processor selected Out of said general-purpose processors, and to forward said incoming packet to said destined general-purpose processor,
to, when said session management entries include a validated session management entry containing said determined entry ID, forward said incoming packet to said destined general-purpose processor identified by said device ID contained in said validated session management entry,
to calculate a session ID using said hash function with said source and destination IP addresses, and said source and destination port numbers of said incoming packet used as arguments,
to determine said entry ID to include said session ID and a destination device ID identifying destined one of said network processors, through which said incoming packet is transmitted from said packet transfer apparatus to an external node,
to, when receiving an outgoing packet from originating one of said general-purpose processors, calculate another session ID using said hash function with source and destination IP addresses, and source and destination port numbers of said outgoing packet used as arguments,
to determine another entry ID to include said anther session ID and an incoming device ID identifying an incoming network processor out of said network processors, said incoming network processor receiving said outgoing packet from an external node, and
to update said device ID within one of said session management entry associated with said entry ID to a device ID identifying said originating one of said general-purpose processors.

10. The packet transfer apparatus comprising according to claim 9, wherein said hash function is defined so that said source and destination IP addresses used as said arguments commute with each other, and so that said source and destination port numbers used as said arguments commute with each other.

11. The packet transfer apparatus according to claim 9, wherein said network processor is programmed to, when receiving another incoming packet having a destination IP address associated with one of said general purpose processors, forward said another incoming packet to said associated one of said general purpose processors.

12. The packet transfer apparatus according to claim 9, wherein each of said session management entries includes an age counter value indicating whether said session management entry is invalidated, wherein said network processor is programmed:

to modify said age counter values within said session management at constant time intervals towards a first predetermined value to thereby invalidate said session management entries, to determine whether each of said session management entries is invalidated based on said associated age counter value, to, when said session management entries include said validated session management entry associated with said session to which said incoming packet belongs, set said age counter value within said associated validated session management entry to a second predetermined value, and to, when said session management entries include said validated session management entry associated with said session to which said outgoing packet belongs, set said age counter value within said associated validated session management entry to a second predetermined value.

13. The packet transfer apparatus according to claim 9, wherein said network processor is programmed to select least-loaded one of said general-purpose processors as said destined general-purpose processor to which said incoming packet is to be forwarded.

14. The packet transfer apparatus according to claim 9, wherein said network processor is programmed to select said destined one of said general-purpose processors in a predetermined order.

15. The packet transfer apparatus according to claim 9, wherein each of said network processors is mounted on a board on which at least one of said general-purpose processors is mounted, and wherein said network processor is programmed to select said destined general-purpose processor out of said at least one of said general-purpose processors mounted at the same board.

16. A computer program product for a packet transfer apparatus including a plurality of general-purpose processors and a plurality of network processors, which is to be installed into each of network processors, said computer program product comprising a computer-readable medium having embedded therein computer-readable code comprising:

a session management table containing session management entries, each of which contains an entry ID associated with a session, and a device ID identifying destined one of said general-purpose processors to which packets belonging to said associated session are to be forwarded, a code module adapted to, when receiving an incoming packet that requires processing by an arbitrary one of said general-purpose processors, to determine an entry ID using a hash function with source and destination IP addresses, and source and destination port numbers of said incoming packet used as arguments, a code module adapted to, when said session management entries include no validated session management entry containing said determined entry ID, prepare another validated session management entry containing said determined entry ID, and a device ID identifying destined general-purpose processor selected out of said general-purpose processors, and to forward said incoming packet to said destined general-purpose processor, and a code module adapted to, when said session management entries include a validated session management entry containing said determined entry ID, forward said incoming packet to said destined general-purpose processor identified by said device ID contained in said validated session management entry.

* * * * *